United States Patent [19]
Harada et al.

[11] Patent Number: 5,947,680
[45] Date of Patent: Sep. 7, 1999

[54] TURBOMACHINERY WITH VARIABLE-ANGLE FLUID GUIDING VANES

[75] Inventors: Hideomi Harada, Fujisawa; Shunro Nishiwaki; Kazuo Takei, both of Yokohama, all of Japan

[73] Assignee: Ebara Corporation, Tokyo, Japan

[21] Appl. No.: 08/708,664

[22] Filed: Sep. 5, 1996

[30] Foreign Application Priority Data

| Sep. 8, 1995 | [JP] | Japan | 7-256717 |
| Sep. 8, 1995 | [JP] | Japan | 7-256718 |
| Sep. 8, 1995 | [JP] | Japan | 7-256719 |
| Sep. 8, 1995 | [JP] | Japan | 7-256720 |

[51] Int. Cl.$^6$ ............................................. F04B 27/02
[52] U.S. Cl. .......................... 415/17; 415/26; 415/36
[58] Field of Search ....................... 415/1, 17, 13, 415/23, 24, 26, 27, 36, 42, 47, 49

[56] References Cited

U.S. PATENT DOCUMENTS

| 4,164,035 | 8/1979 | Glennon et al. . | |
| 4,288,198 | 9/1981 | Hibino et al. . | |
| 4,608,833 | 9/1986 | Kountz . | |
| 4,686,834 | 8/1987 | Haley et al. . | |
| 5,095,714 | 3/1992 | Adachi et al. | 415/49 |
| 5,152,661 | 10/1992 | Sheets . | |
| 5,355,691 | 10/1994 | Sullivan et al. . | |
| 5,368,440 | 11/1994 | Japikse et al. . | |
| 5,618,160 | 4/1997 | Harada et al. | 415/17 |
| 5,683,223 | 11/1997 | Harada et al. | 415/17 |

FOREIGN PATENT DOCUMENTS

| 0 086 774 A1 | 12/1995 | European Pat. Off. . |
| 0 685 652 A2 | 12/1995 | European Pat. Off. . |
| 0719944A2 | 7/1996 | European Pat. Off. . |

OTHER PUBLICATIONS

Patent Abstract of Japan, Pub. No. 04081598, May 16, 1992, Nissan Motor Co., Ltd. European Search Report, Appln. No. EP96114398, Jun. 22, 1998.

*Primary Examiner*—F. Daniel Lopez
*Assistant Examiner*—Richard Woo
*Attorney, Agent, or Firm*—Armstrong, Westerman, Hattori, McLeland & Naughton

[57] ABSTRACT

Driven turbomachinery for use in centrifugal and mixed flow pump overcomes operational for overcoming difficulties, such as flow separation and generation of surge at low flow rates, often encountered in similar machines of the conventional design. The turbomachinery is provided with variable-angle inlet guide vane and variable-angle diffuser vanes, and the diffuser section is constructed according to a fluid dynamic principle, and the vanes having a wing shape are distributed tangentially so that the diffuser section acts as a centrifugal diffuser. A convenient operational parameter, chosen from such variables as input current to the drive motor, rotational speed or torque of the drive motor, inlet/exit pressures, and fluid velocity, is monitored during the operation by means of sensors strategically attached to parts of the operating system. Real-time changes in the operating parameter is measured and the setting angle of the inlet guide vane is adjusted in accordance with a predetermined relation between inlet flow volume rates and flow angle of the fluid exiting from the impeller so as to maintain the fluctuations in the monitored operating parameter below a threshold value. If the targeted head value is not produced under this adjustment, the setting angle of the diffuser vanes can also be adjusted based on real-time measurements of other operational parameters. If this adjustment fails to produce the targeted head value, then the rotational speed of the impeller can be adjusted to operate the system while avoiding surge and other problems encountered at flow rates.

17 Claims, 34 Drawing Sheets

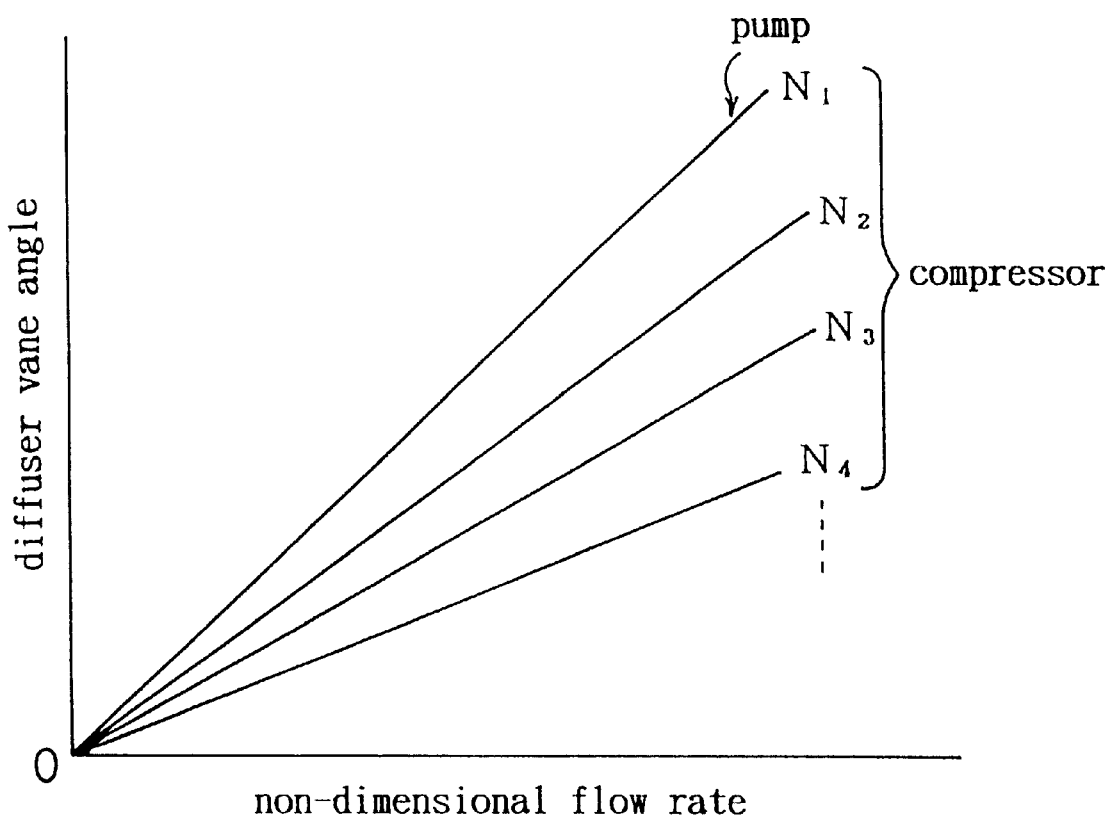
F I G. 4

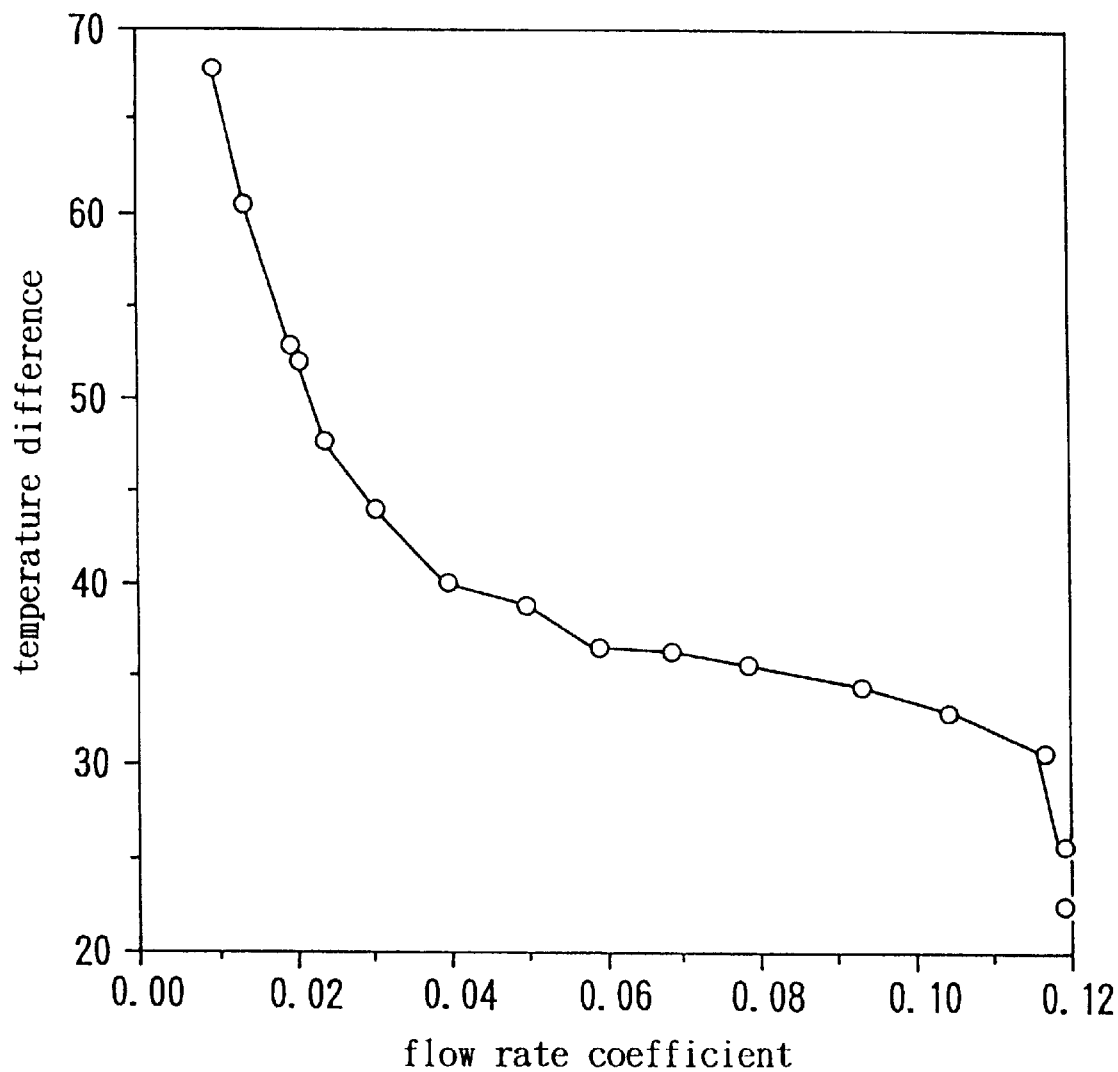
F I G. 5

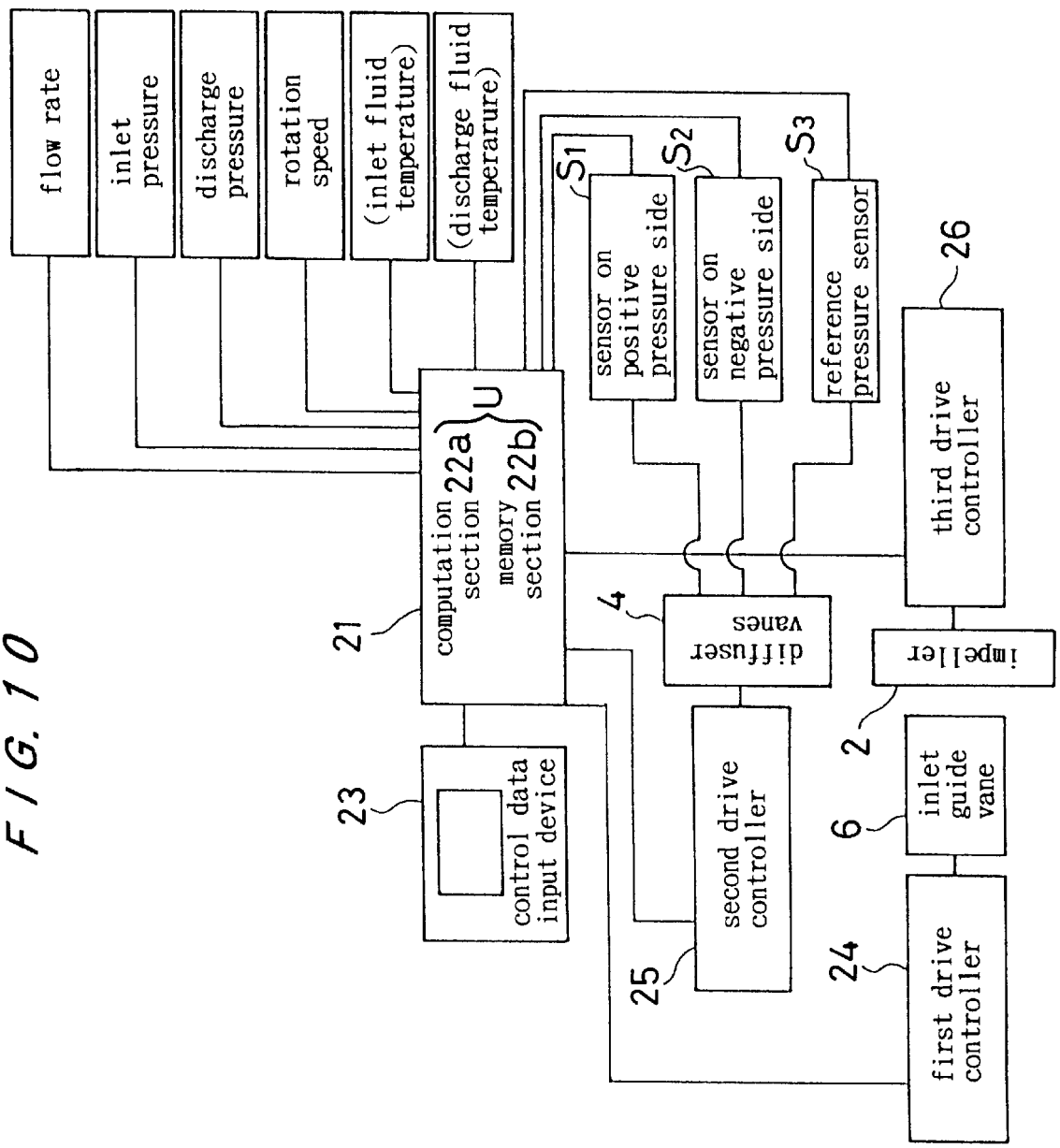

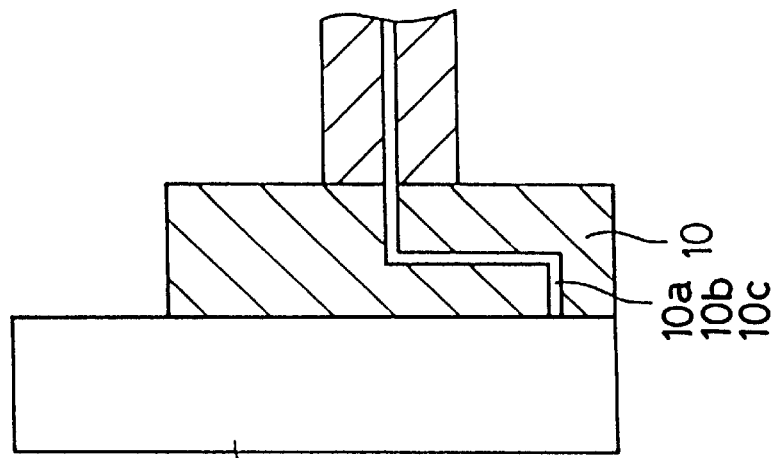
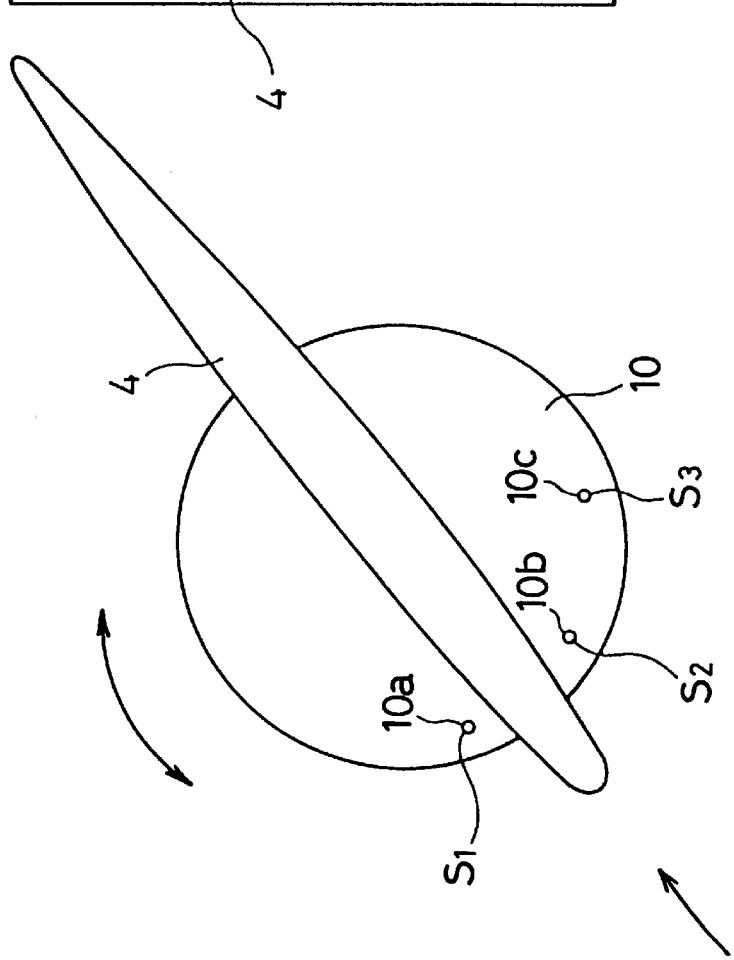

F I G. 1 3
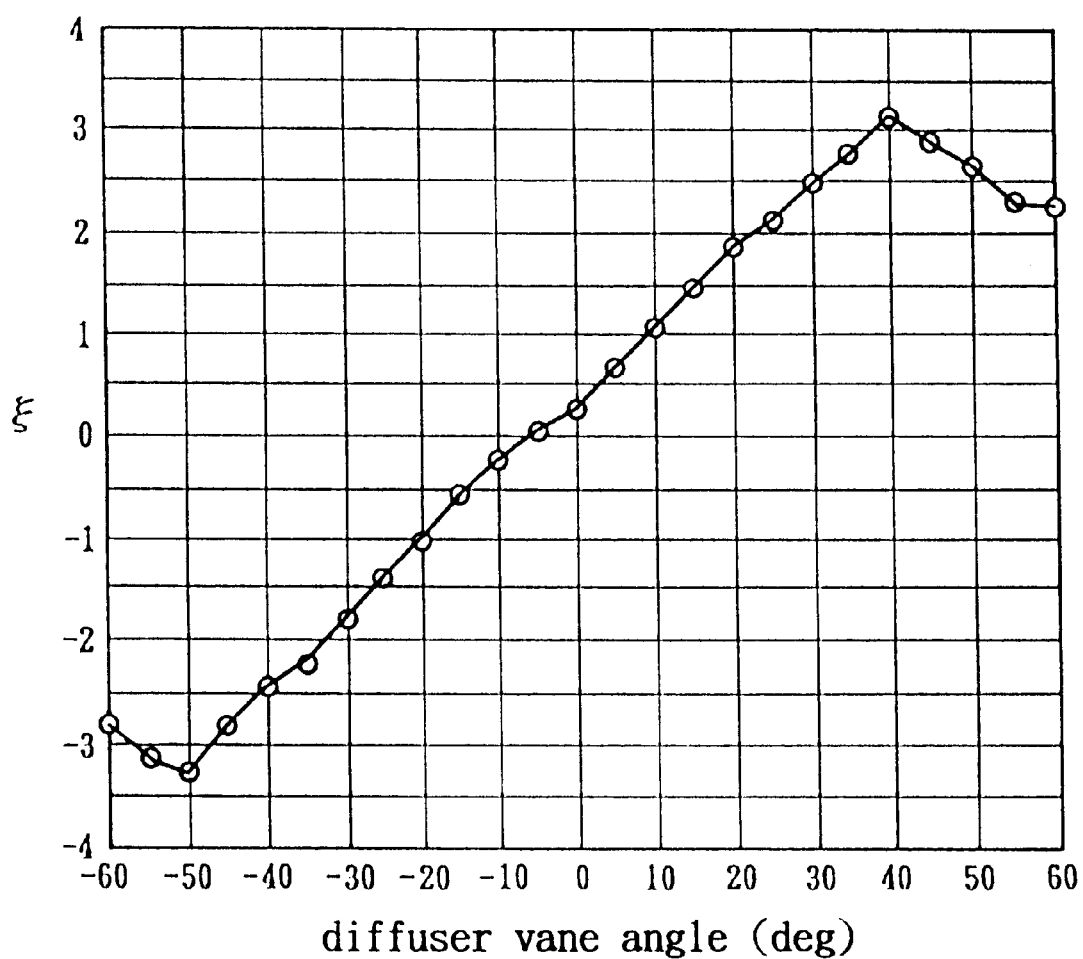
diffuser vane performance curve

F I G. 16
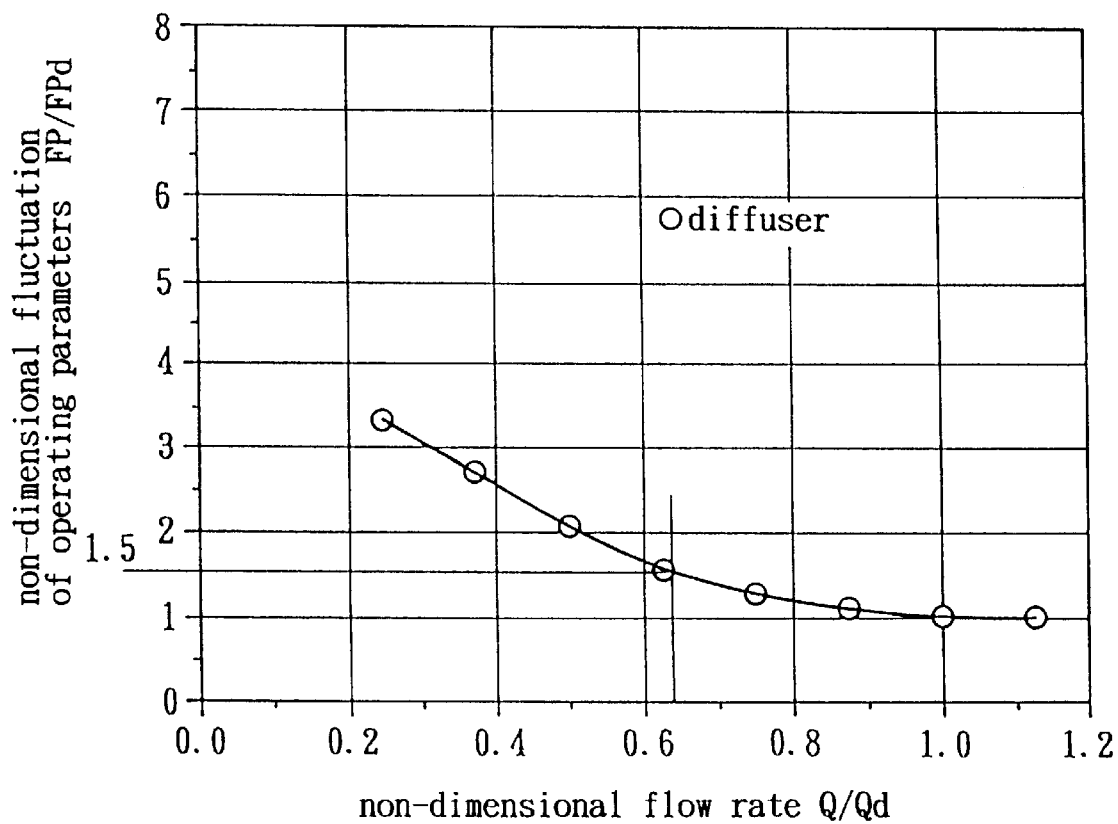

F I G. 26
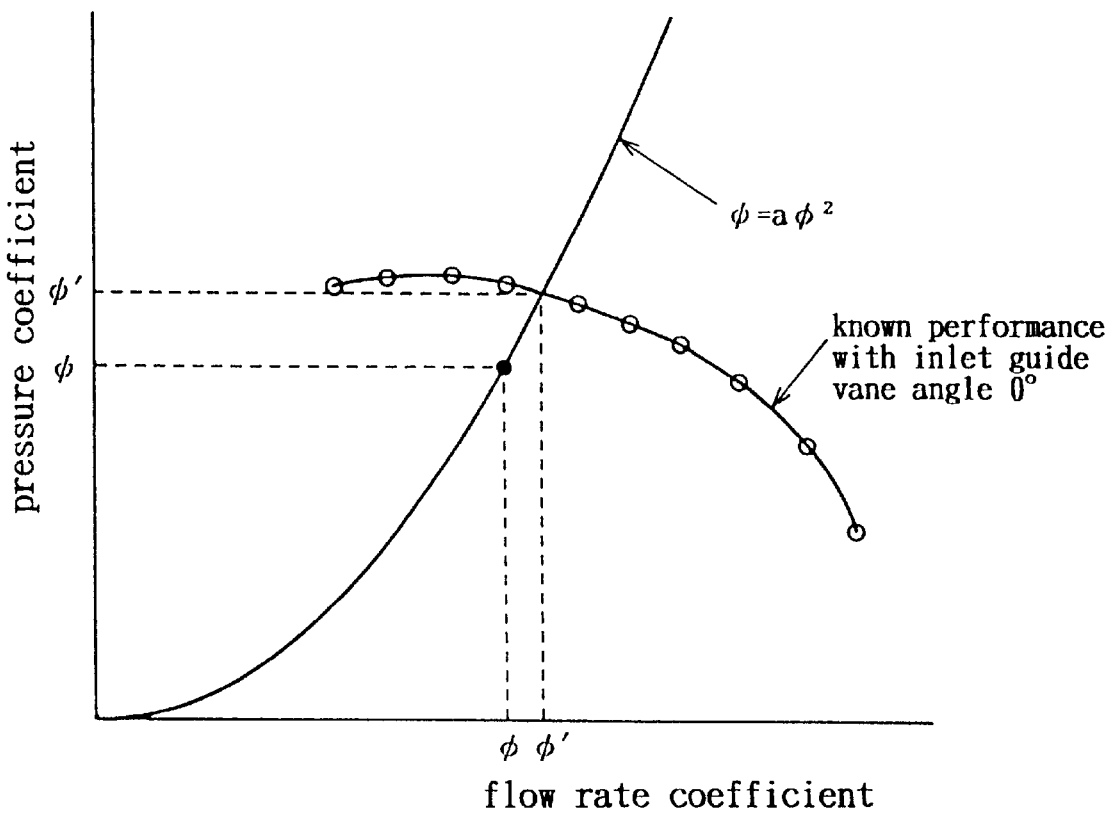

TURBOMACHINERY WITH VARIABLE-ANGLE FLUID GUIDING VANES

BACKGROUND OF THE INVENTION

1. Field of the Invention

The present invention relates in general to a turbomachinery of a centrifugal or mixed flow type for use in fluid pumps, gaseous blowers and compressors, and relates in particular to a turbomachinery having inlet guide vanes and diffuser vanes.

2. Description of the Related Art

When a centrifugal or mixed flow pump is operated below the design flow rate of the pump, flow separation occurs in the impeller, diffusers and other components in the pump, thus lowering the operating efficiency of the pump to a value below its design efficiency. To overcome such problems, it has been a practice to provide variable-angle inlet guide vanes and diffuser guide vanes to adjust the vanes to suit the fluid flow pattern.

Typical examples of prior art references are: Japanese Patent Publication, H4-18158; Japanese Patent Publication, H4-18159; Japanese Laid-open Patent Publication, S63-239398; Japanese Laid-open Patent Publication, S63-230999; Japanese Laid-open Patent Publication, S55-107097.

In the above-mentioned method, controlling of the turbomachinery was conducted basically to adjust the diffuser vanes with the flow direction at the exit of the impeller for improving the performance and especially for avoiding the instability phenomenon at a low flow rate region. This was commonly acknowledged for a turbomachinery having diffuser vanes of conventional size and configuration.

However, the inventors have developed a novel diffuser vanes having novel configuration, and found that, at a higher flow rate region than a design flow rate, a higher performance of the turbomachinery is obtainable by using a novel control method different from the conventional one.

Further, in the conventional art described above, to control the angle of the diffuser vanes to suit an operating condition of the pump, it is necessary beforehand to accurately estimate the flow pattern from the impeller. Furthermore, for those pumps having inlet guide vanes, every time the setting angle of the guide vane is adjusted, the flow pattern of the fluid from the impeller changes for each setting angle of the guide vanes. It follows therefore that it is necessary to know beforehand, the performance characteristics of the pump for each setting angle of the guide vane.

In the conventional technologies mentioned above, it is necessary to perform tests for each angle of the inlet guide vane, by assigning a certain setting angle to the diffuser vanes and operate the pump on the basis of the experimentally obtained data. This approach presented a problem that the control technique is complex, and required an expenditure of high capital cost for the equipment as well as for the development of control programs. Additional problem is that it takes much time until a system is operated automatically at their optimum setting angles for the vanes.

A method for calculating the flow angle from the impeller exit is disclosed in a Japanese Laid-open Patent Publication, H4-81598, but this method involves several defects such that it includes several assumptions regarding the flow angle, that, because the flow pattern is distorted at the impeller exit in general, the calculation of flow angle based on the static pressure on the wall surface is questionable, and that, in the region of a flow instability, the precision of the computed results is also questionable.

There is a method in which pressure holes are provided on the diffuser vanes to measure the pressure so as to compute the direction of the flow from the impeller exit, as disclosed for example in a Japanese Laid-open Patent Publication, S57-56699, but this method is unsuitable for diffusers having thin vanes, and additional cost of fabrication of the holes is high.

A technique for measuring the wall pressure on the pressure side and suction side of the diffuser vanes has been disclosed in a Japanese Laid-open Patent Publication, S62-51794, but because the hole is provided on the wall surface of the diffuser, changes in the relative location of the holes, when the diffuser vanes are rotated, made it impossible to measure the pressure when a pressure hole becomes hidden by the diffuser vanes.

Furthermore, when the setting angles of the inlet guide vanes and diffuser vanes are adjusted, the pump performance can be altered significantly; therefore, unless the flow angle from the impeller is already known, it has been necessary to perform detailed performance tests for each setting angle of the guide vanes, and to determine the setting angles for the guide vanes and diffuser vanes based on these test results.

To control the pump automatically using the above method, it has been necessary to change the setting angles at least three times for testing (see for example, a Japanese Patent Publication, H4-18158, and a Japanese Patent Publication, H4-18159) to assess the characteristics of the pump in a particular operating situation, before the setting angle of the guide vanes and diffuser vanes can be selected. This methodology is time-consuming, and in particular, the method is unsuitable when it is necessary to decide the changes instantaneously, which would be the situation near a surge point.

The control methodology is even more difficult if the rotational speed of the pump is to be adjusted. Such an approach requires an advanced control facility, and the equipment and control programs becomes expensive.

A method to determine the angle of the diffuser vane from measurements of pressures existing at pressure holes fabricated on the surface of the diffuser vanes is disclosed in a Japanese Patent Publication, S57-56699, but the flow pattern of the flow from the impeller exit changes greatly in the width direction of the diffuser vanes depending on the operating condition of the pump, and therefore, if the measurements are taken only at the pressure holes located in the center region of the diffuser vanes, the deduced flow angles tended to be highly erroneous.

Further, because the pressure holes are located on the surface of the diffuser vanes, the total pressure is measured unexpectedly, and, in case of the machine handling high speed flow, the pressure level is generally larger than the static pressure, then, it is necessary to provide a high-range pressure gages, and therefore the precision of measured data is inadequate. Also, this method is not suitable for vanes having thin vane thickness, and the cost is high.

SUMMARY OF THE INVENTION

It is an object of the present invention to provide a turbomachinery having inlet guide vanes which can provide a high performance operation in the region of stable operation at flow rates equal to or higher than the design flow rate, and a stable operation by avoiding a phenomenon of instability which occurs when a conventional turbomachinery at flow rates lower than the design flow rate, by controlling the setting angle of the diffuser vanes so as to exhibit the maximum capable performance of a fluid handling system operated over a wide range of flow rates.

The present invention is directed to a turbomachinery with variable-angle flow guiding device comprising: an impeller; variable-angle diffuser vanes; a drive control means for maintaining said diffuser vanes at a setting angle which is oblique by a selected attack angle to an exit flow angle at the exit of said impeller.

The basic idea which led to the present invention will be explained in some detail in the following with reference to FIG. 1, which shows the flow conditions at the exit section of the impeller 2. The directions of the flow from the impeller 2 exit are shown by arrows as a (design flow rate); b (low flow rate); and c (high flow rate). As seen clearly in this illustration, at flow rates other than the design flow rate, flow separation takes place, because the angle of attack of the flow becomes excessive in the pressure side of the diffuser vane 4 at high flow rates while it becomes excessive in the suction side of the diffuser vane 4 at low flow rates. This situation produces the condition shown in FIG. 2A (shown by the non-dimensional inlet flow volume rate and the non-dimensional diffuser loss) such that the diffuser loss increases. The result is that the overall performance of the compressor system becomes low as shown in FIG. 2B (shown by the correlation between the non-dimensional flow rate and non-dimensional efficiency) at both higher and lower flow rates than the design flow rate.

In the present invention, the diffuser vanes are designed with comparatively small chord/pitch ratio given by a ratio of the vane chord length to the vane pitch. The operation of the vanes of the present invention is based totally on a different principle than that governing the operation of the conventional diffusers. In the conventional diffuser vanes, the fluid path are formed by the spaces between the vanes, and the pressure increase is produced by a velocity decrease brought about by widening of the fluid path between the inlet and exit sections. However, the diffuser vanes used in the present invention are spaced apart more widely, and the fluid paths are not formed by the spaces between the vanes. The principle of static pressure increase is based on the circulation around the wing. This is explained in detail in the following.

The circulation around a vane placed in a fluid flow can be expressed as follows:

$$\Gamma = (Cu_1 - Cu_2)t \qquad (1)$$

where Cu is the tangential velocity component of the diffuser vane; t is the vane pitch; subscript 1 refers to the diffuser inlet; and subscript 2 refers to the diffuser exit.

The static pressure at the diffuser exit is given by:

$$Ps_2 = \rho(Cu_1^2 - Cu_2^2)/2 + Ps_1 \qquad (2)$$
$$= \rho(Cu_1 - Cu_2) \cdot (Cu_1 + Cu_2)/2 + Ps_1$$
$$= \rho\Gamma(Cu_1 + Cu_2)/2t + Ps_1$$

where $\rho$ is the density of the fluid.

The circulation can also be expressed as follows:

$$\Gamma = L/(W \cdot \rho) \qquad (3)$$

where L is the lift of a vane, and W is the vane upflow velocity.

The lift acting on the vane can be expressed as follows:

$$\Gamma = CL \cdot 1 \cdot \rho \cdot W^2/2 \qquad (4)$$

where CL is the lift coefficient of the vane, and 1 is the vane length.

It follows therefore that, $$\Gamma = CL \cdot 1 \cdot W/2 \qquad (5)$$

indicating that the magnitude of the circulation is proportional to the lift coefficient.

In general, the performance of a wing or vane is dependent on the angle of attack, and the greater the angle of attack the greater the lifting force; however, when the angle of attack becomes excessive, flow separation occurs at the suction side of the wing, resulting in a loss of fluid. The relationship between the lift and the angle of attack is determined by wind tunnel experiments and the like.

The diffuser of the present invention has been constructed according to such a fluid dynamic principle, and the vanes having an airfoil shape are disposed peripherally so that the diffuser section acts as a diffuser. It can be seen from equation (2) that the pressure at the diffuser exit is dependent on the circulation around the vane, and that the circulation is proportional to the lift coefficient of the vane from equation (5). Therefore, to increase the pressure at the diffuser exit, the angle of attack of the vanes should be increased as much as possible without introducing flow separation so as to maintain a high lift coefficient.

The first step in the control of the diffuser vane angle is to obtain the flow direction $\alpha$ of the flow from the impeller exit. Then, a setting angle for the maximum performance of the vanes is determined by obtaining an angle of attack $\beta$ at which lift coefficient becomes equal to a maximum lift coefficient multiplied by some rate, and adding the angle of attack $\beta$ to a flow angle $\alpha$ from the impeller exit. The difference between the current vane angle and the computed angle is obtained, and the diffuser vanes are adjusted until this difference is eliminated.

The reason for computing a lift coefficient by multiplying some rate by maximum lift coefficient is that, in a radial diffuser, as the radius increases the area becomes large and the flow velocity decreases. Therefore, in the boundary layer on the vane surface, the pressure gradient becomes more highly unfavorable, and it can be anticipated that the loss in the flow is more severe than expected from the test results on a single wing or a two-dimensional cascade. The multiplier rate depends on the design of the diffuser which produces pressure increase, and must be determined separately for each arrangement of the vanes. The optimum condition can be determined by experimentation or by numerical computation.

FIG. 3 is a graph showing results of using three different vane angles to obtain the static pressure recovery coefficient in the diffuser section experimentally. It can be seen in this graph that the maximum static pressure recovery is produced when the angle of attack of the vanes is about 3 degrees. The angle of attack depends on the Mach and Reynolds numbers of the flow, the width of the diffuser to which the vanes are attached, and the lateral distortion in the direction of the flow from the impeller exit. Therefore, it is necessary to determine the angle of attack for each type of turbomachinery or from operational trials using various setting angles of the diffuser vanes.

Next, methods for determining the flow angle $\alpha$ from the impeller exit will be discussed. There are three ways to determine $\alpha$ in a broad classification. The first one is to measure a static pressure by pressure sensors provided on both pressure side and suction side surfaces of the diffuser vane, and calculating the pressure difference between the measured value to determine $\alpha$. This is based on the fact that the pressure difference becomes minimum when the diffuser vane angle is coincided with the flow angle $\alpha$. This method is not effective at the low flow rate range below the design flow rate, where flow distortion is generated which lowers the precision of the pressure measurements. However, it is effective in a flow rate range at and above the design flow rate where adding β is necessary. This will be further explained later in detail with reference to FIGS. 12 to 14.

The second method is to measure some state quantity such as pressure at certain locations of the turbomachinery while changing the diffuser vane angle at the same flow rate. Here, the diffuser vane angle where fluctuation of the measured state quantity is minimum will be determined as α at the flow rate. This method is not effective at a flow rate range around or above the design flow rate where fluctuation itself is small. Therefore, this method is only for supplementary use.

According to the results of the experiments conducted by the inventors, it has been found that, in the case of a pump, the optimum angle α of the diffuser vanes exhibits an approximate straight line relation between the vane angle and the non-dimensional inlet flow volume rate, as shown in FIG. 4 at a revolution N1. The results shown in FIG. 4 were obtained by conducting experiments to produce a most stable operation for the diffuser vanes at a given flow rate. The stability of operation was evaluated by the degree of fluctuations observed in pressure sensors placed in various locations of pipes and pump casing. In the case of compressors, the slopes of the lines are different for different rotational speeds, because of the compressibility of gaseous media (refer to lines $N_1 \sim N_4$ in FIG. 4). The slope can be calculated by predicting the operating conditions at the impeller exit.

The third method for determining α is to deduce a relationship between flow rate and α of the turbomachinery through theoretical analysis. In general, if such a relationship is obtained for a certain type of turbomachinery along with a certain theoretical model, it can be applicable by diverting it to fit to the individual turbomachinery through similitude.

In this aspect of the invention, the turbomachinery is provided with an impeller, diffuser vanes and detection devices for determining the operating parameters dependent on inlet flow volume rate or changes in the flow rate, and the flow angle is computed from the following equation on the basis of either the inlet flow volume rate or an operating parameter measured by the detection devices. The result is added to a suitable angle of attack to determine the diffuser vane angle to correspond with the operating parameters. The inlet flow rate is given by:

$$\alpha = \arctan\{Q/(K_1 N - K_2 Q)\} \quad (10)$$

where α is the flow angle; Q is the inlet flow volume rate; $K_1$ is a constant given by $(\pi D_2)^2 \sigma b_2 B$; $K_2$ is a constant given by $\cot \beta_2$, σ is a slip factor, B is a blockage factor; N is the rotational speed, $\beta_2$ is the blade exit angle of the impeller in the tangential direction, and $D_2$ is the impeller outer diameter.

The flow angle α is obtained according to the following consideration.

Denoting the flow rate at the impeller exit by $Q_2$, the outer diameter of the impeller by $D_2$, the exit width of the impeller by $b_2$, and the blockage factor at the impeller exit by B, then the radial velocity component $Cm_2$ at the impeller exit is given by:

$$Cm_2 = Q_2/(\pi D_2 b_2 B) \quad (11)$$

Assuming that the fluid is incompressible, the radial velocity component $Cm_2$ is given by:

$$Cm_2 = Q/(\pi D_2 b_2 B) \quad (12)$$

Here, when the fluid is flowing within the diffuser section, the actual flow in the boundary layer near the wall surface is smaller than in the main flow. Denoting the main flow velocity by U and the velocity within the boundary layer by u, the flow rate due to the velocity difference is given by:

$$\int_0^\infty (U-u) dy \quad (13)$$

Denoting the displacement thickness by δ*, and if it is assumed that the flow rate within the thickness region is equal to U, the flow rate is given by Uδ*. Because the two quantities are the same, the displacement thickness in the boundary layer is given by:

$$\delta^* = (1/U) \int_0^\infty (U-u) dy \quad (14)$$

(Refer, for example, to Fluid Dynamics (2), Corona Publication, Dynamics of Internal Flow, Yokendo Publication).

In general, computation of the average velocity inside the fluid path cross section is made by taking into account of the effect of the displacement thickness on the narrowing of the fluid path width, but in the case of turbomachineries, the flow pattern of the flow from the impeller exit is not uniform in the width direction of the flow (see, for example, the Transaction of Japan Society of Mechanical Engineers, v.44, No.384, "Study of relative velocities distribution and performance of a centrifugal impeller", FIG. 20). The region of velocity less than the main flow becomes even larger than the thickness generated by the boundary layer. Therefore, the geometric width must be corrected by considering the displacement thickness of the boundary layer and the changes in the width caused by the velocity distortion. Otherwise, the velocity within the fluid path cross section is underestimated, and the flow angle computed on the basis of such a velocity value would be erroneous. In the present invention, the correction in the width is made by considering the blockage factor.

Turning to the other fluid velocity component, namely the tangential (or peripheral) velocity component $Cu_2$ is given by:

$$Cu_2 = \sigma U_2 - Cm_2 \cdot \cot \beta_2 \quad (15)$$

where σ is a slip factor and $\beta_2$ is the blade exit angle of the impeller in the tangential direction and $U_2$ is the peripheral speed of the impeller. It follows that the flow angle α from the impeller exit is given by:

$$\alpha = \arctan(Cm_2/Cu_2) \quad (16)$$
$$= \arctan\{Q/(\pi \sigma D_2 U_2 b_2 B - Q \cdot \cot \beta_2)\}$$

Denoting a pair of constants by $$K_1 = (\pi D_2)^2 \sigma b_2 B \text{ and } K_2 = \cot \beta_2 \quad (17)$$

and designating the rotational speed by N, equation (16) can be rewritten as:

$$\alpha = \arctan\{Q/(K_1 N - K_2 Q)\} \quad (18)$$

If the fluid is compressible, the impeller discharge volume $Q_2$ is given conveniently by:

$$Q_2 = (1/P_r)^{1/\kappa} \cdot Q \quad (19)$$

where $P_r$ is pressure ratio of the impeller inlet and exit and k is a specific heat ratio of the fluid. Therefore, it follows that:

$$Cm_2 = (1/P_r)^{1/\kappa} \cdot Q/(\pi D_2 b_2 B) \qquad (20)$$

Combining equations (10) and (15), the flow angle from the impeller exit is given by:

$$\begin{aligned}\alpha &= \arctan(Cm_2/Cu_2) \qquad (21)\\ &= \arctan[(1/P_r)^{1/\kappa} \cdot Q/\{K_1 N - (1/P_r)^{1/\kappa} \cdot K_2 Q\}]\end{aligned}$$

In the present invention, a suitable value of the angle of attack β is added to the flow angle α thus obtained to compute the diffuser vane angle, and the diffusers are adjusted to match the computed angle.

Regarding the operational parameter for determining the flow angle, there is no need to measure the inlet flow volume rate directly. Alternatively, some parameter which has a relation to the inlet flow volume rate of the pump may be chosen to establish a relationship between the parameter and the diffuser vane angles directly or in terms of the inlet flow volume rate. By measuring the fluctuation in such a parameter, it can be understood that the control of the diffuser vane angle can be achieved.

Suitable operating parameter for such measurements are, for example, input current to an electrical drive, rotational speed and torque, inlet pressure, fluid velocity in piping, temperature difference at the inlet and exit, sound, valve opening, and the quantity of heat exchange when the heat generated in the compressor is cooled by gas cooler and other means. These parameters will be further explained below.

(1) Input Current to Electrical Drive

If the compressor is driven by an electrical driver, an operating parameter related to the inlet flow volume rate can be an input current to the drive, which provides a reasonable measure of the inlet flow volume rate. The drive power L is given by:

$$L = \eta_m \cdot \eta_p \cdot V \cdot A = \rho \cdot g \cdot H \cdot Q/\eta \qquad (6)$$

where $\eta_m$ is a driver efficiency; $\eta_p$ is a drive power factor; V is an input voltage to the driver; A is an input current to the driver; ρ is a fluid density; H is a head; Q is an inlet flow volume rate; and η is the efficiency of the device being driven. Therefore, it can be seen that the driver current is a parameter of the inlet flow volume rate. However, it should be noted that, because the efficiency of the driven device decreases along with the decreasing flow volume rate and the drive input power is a variable dependent on the fluid density and head, there is a limit to the utility of this relation.

(2) Rotational speed of the Electrical Drive

The drive power L is given by:

$$L = T \cdot \omega \qquad (7)$$

where T is a torque value; and ω is an angular velocity. Thus, by measuring the revolutions of the drive and the resulting torque, it is possible to estimate the inlet flow volume rate to some extent. If the rotational speed of the drive is constant, then only the torque needs to be determined.

(3) Inlet Pressure

The flow rate Q flowing through a pipe is given by:

$$Q = A \cdot v = A \cdot \{\rho \cdot (Pt - Ps)/2\}^{1/2} \qquad (8)$$

where A is the cross sectional area of the pipe; v is an average fluid velocity in the pipe; Pt is a total pressure; and Ps is a static pressure. If the pressure at the inlet side is atmospheric, the total pressure can be made constant, so if the static pressure can be found, the inlet flow volume rate can be obtained. Therefore, by measuring the static pressure at the inlet bell mouth section of the compressor, it is possible to obtain data related to the inlet flow volume rate reasonably. In this case, it is necessary to measure the static pressure of the incoming flow accurately by eliminating the fluid backflow which occurs from the impeller at low flow rates.

(4) Exit Pressure

The exit pressure of the compressor can be measured to estimate the inlet flow volume rate. If the turbomachinery is a pump handling an incompressible fluid, the exit volume is equal to the inlet volume, but if the turbomachinery is a compressor handling a compressible fluid, then it is necessary to have some method for determining the density of the fluid.

(5) Flow Velocity in the Pipe

The flow velocity within the pipe, similar to the inlet pressure, can be measured to provide some data for the inlet flow volume rate. Velocity measurement can be carried out by such methods as hot-wire velocimeter, laser velocimeter and ultrasound velocimeter.

(6) Inlet/Exit Temperatures

For compressors, the difference between the inlet and exit temperatures can vary depending on the flow rates. FIG. 5 shows a correlation between the temperature difference at the inlet/exit for a compressor and the flow coefficient on the x-axis. For compressors, the temperature difference can provide work coefficient (refer to FIG. 6), but the relation is similar to the temperature difference, and therefore, measuring such a parameter can provide data on the inlet flow volume rate. The results shown in FIG. 6 were obtained under two different rotation counts $N_1$, $N_2$.

(7) Temperature Difference in Gas-Cooling Water

When the heat generated in the compressor is cooled by a gas cooler, the quantity of heat exchanged is given by:

$$L = (T_1 - T_2) \cdot Cp \cdot W \qquad (9)$$

where $T_1$ is the fluid temperature at the inlet of the gas cooler; $T_2$ is the fluid temperature at the exit of the gas cooler; Cp is the specific heat of the gas; and W is the mass flow rate. The heat generated by the compressor depends on the inlet flow volume rate, therefore, by measuring the temperature difference of the cooling medium, it is possible to obtain some data on the inlet flow volume rate.

(8) Sound Effects

The noise generated in the compressor or Straw-Hull Number related flow velocity can also provide some data on the flow rate.

(9) Valve Opening

The degree of opening of inlet or exit valve of the device attached to the compressor is related to the fluid flow rate, therefore, by measuring the opening of valves, it is possible to correlate data to the flow rate.

Next, methods for applying the present invention to practice the control of actual turbomachinery will be described. The parameter on which the turbomachinery is controlled by control device can be selected as pressure difference on both sides of the diffuser in the first method, some state quantity of the turbomachinery capable of representing the fluctuation for use in the second method. Otherwise, the parameter can be selected as flow rate or relating state quantity. In the former method, α is calculated each time the parameter is measured, but in the latter, it is only necessary to store the relationship between α and parameter in the memory of the controller beforehand.

This invention described above is aimed for improving the performance of a turbomachinery operated at or above the design flow rate range. If the turbomachinery is operated below the design flow rate, flow separation occurs in the impeller and diffuser and other components in the turbomachinery which leads to a phenomenon called "surge". In such a region, the turbomachinery should be operated by controlling the diffuser vane to adjust to the flow angle α from the impeller exit.

FIG. 7A shows the output waveforms from the sensors, and the left graphs show the pressure measurements from two locations in the tangential directions of the diffuser, and the right graphs refer to those at the suction pipe and the exit pipe. As evident from these traces, when the flow rate is decreased below the design flow rate, large pressure fluctuations are observed in the diffuser section (refer to left traces at flow rate 2) and when the flow is decreased further, the fluctuations at the pipe become severe (refer to right traces at flow rate 3) thus causing a surge.

FIG. 7B shows a relation between the non-dimensional flow rate normalized by the design flow rate and the non-dimensional head coefficient normalized by the value of the design flow rate. The flow rates 1, and 3 in FIG. 7B correspond to those in FIG. 7A. Therefore, it is clear that by detecting such variations quantitatively and using a suitable threshold value, it is possible to provide early warning and take quick remedial steps to prevent the onset of surge to provide a stable operation of the pump system.

BRIEF DESCRIPTION OF THE DRAWINGS

FIG. 4 is a graph showing a relationship between inlet flow rate and the diffuser setting angle.

FIG. 5 is a graph showing the temperature differences at the inlet and exit sections of the compressor and the flow rate.

FIG. 10 is a block diagram of a first embodiment of the turbomachinery of the present invention with variable fluid guide vanes.

FIG. 11A is a front view of a pressure hole provided on a disc for attaching the diffuser vanes.

FIG. 11B is a cross sectional view of a pressure hole provided on a disc for attaching the diffuser vanes.

FIG. 13 is a graph showing a predetermined flow angle in a test chamber and ξ.

FIG. 16 is a graph showing a method of obtaining a threshold value in a turbomachinery of the present invention having variable fluid guide vanes.

FIG. 26 shows graphs of performance curve of the turbomachinery and the resistance curve.

DESCRIPTION OF THE PREFERRED EMBODIMENTS

In the following, some preferred embodiments of the turbomachinery of the present invention will be presented.

Figure 8:
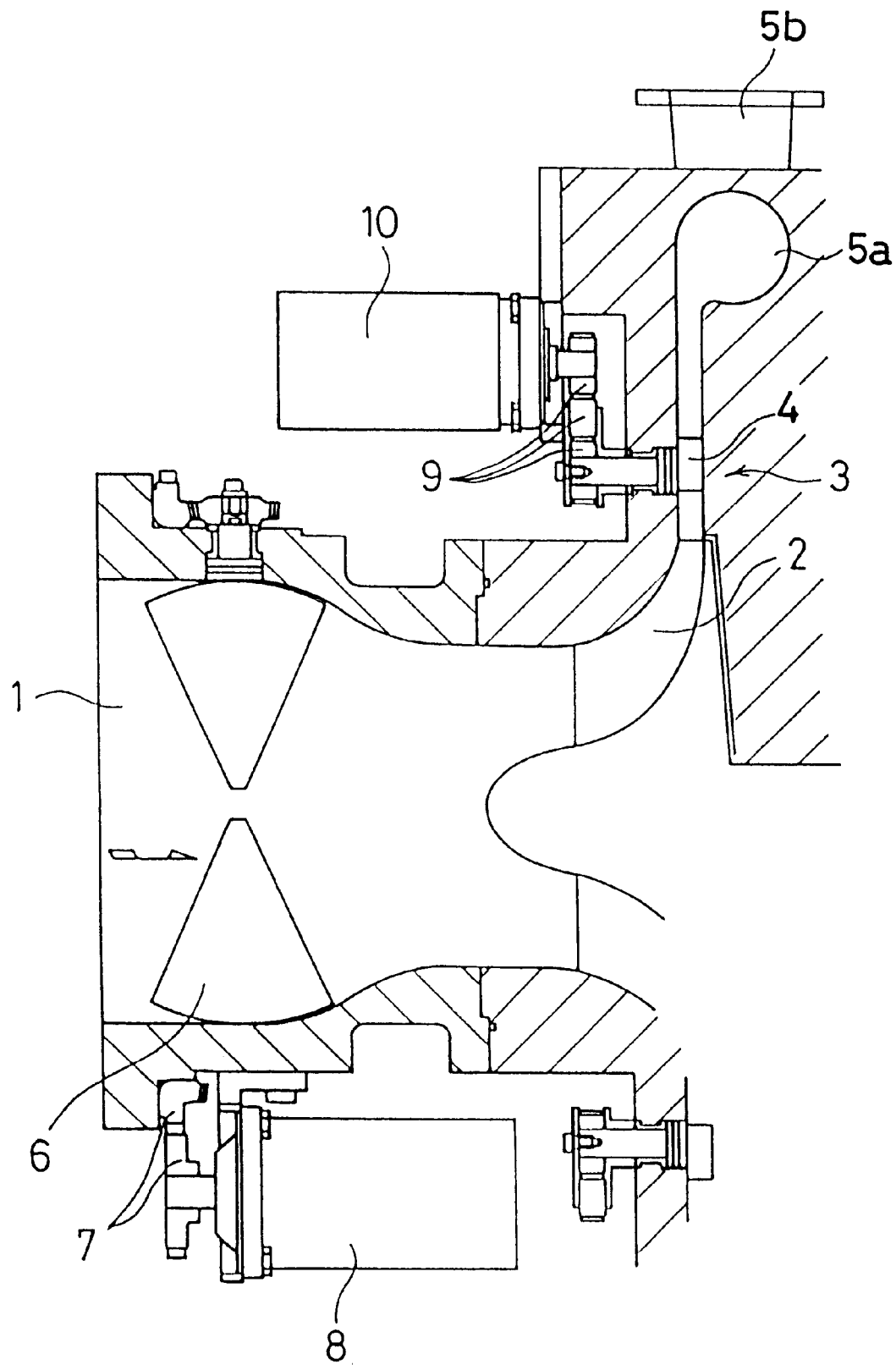
FIG. 8 is a cross sectional view of an embodiment of a turbomachinery having variable-angle vanes for a single-stage centrifugal compressor.
Figure 9:
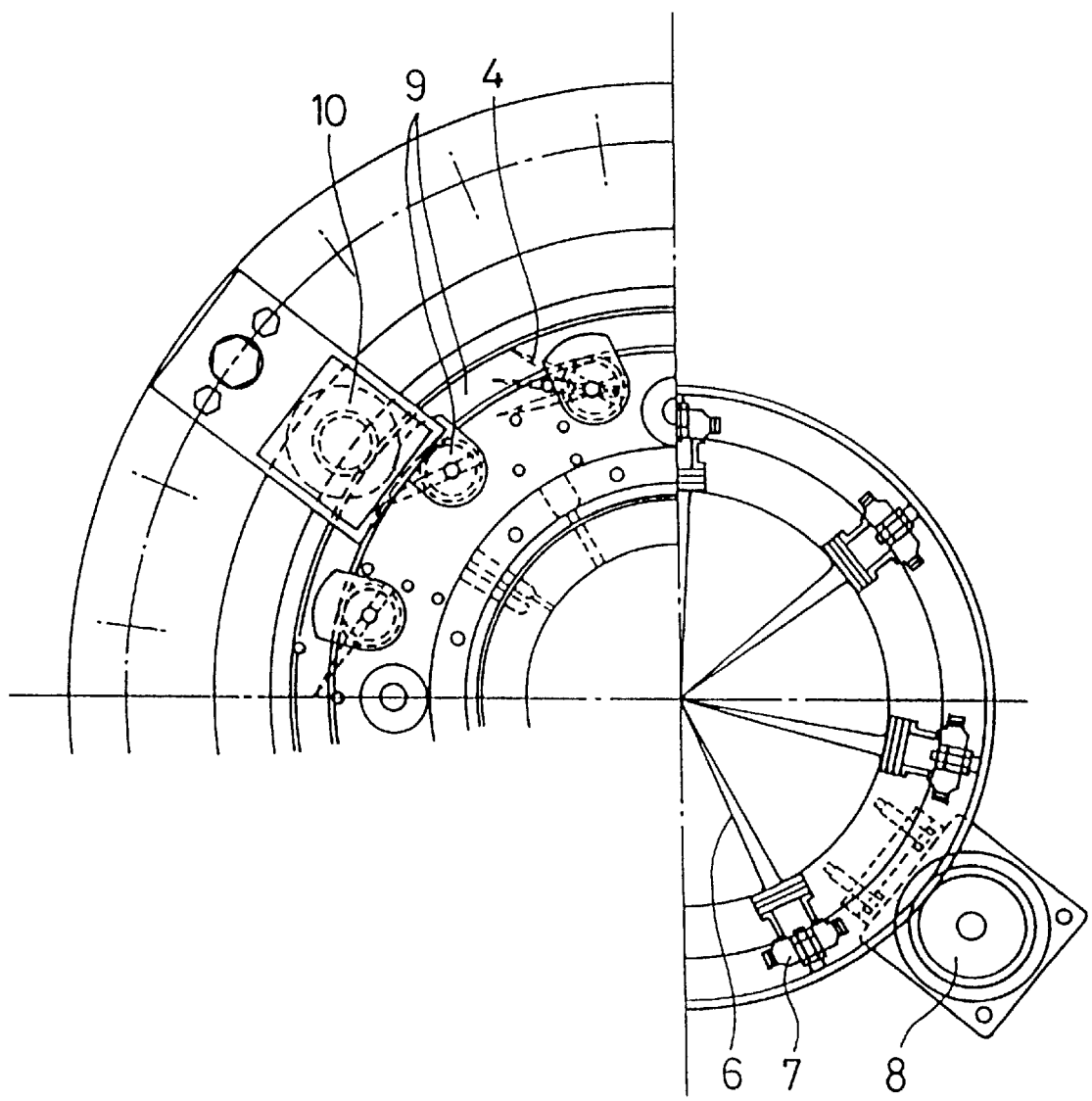
FIG. 9 is a detailed partial side view of the actuator shown in FIG. 8.

FIGS. 8 and 9 refer to a single-stage centrifugal compressor, and FIG. 8 is a vertical cross sectional view and FIG. 9 is a partial side view. The fluid flowing into the compressor through the inlet pipe 1 is given motion energy by the rotating impeller 2, is sent to the diffuser 3 to increase the fluid pressure, and is passed through the scroll 5a, and discharged from the discharge pipe 5b.

The inlet pipe 1 is provided with a plurality of fan-shaped inlet guide vanes 6 arranged in the circumferential direction, connected to an actuator 8 coupled to a transmission device 7. The diffuser 3 arranged downflow of the impeller is provided with diffuser vanes 4 which are also connected to an actuator 10 through a transmission device 9. Therefore, the angle of each of these vanes are adjustable.

FIG. 10 is a block diagram of the control section for controlling the operation of the turbomachinery having variable guide vanes. As shown in FIG. 10, a pump with variable guide vanes has a computation device 21 comprising a computation section 22a and a memory section 22b. As shown in FIG. 10, the pump is provided with a data input device 23 for inputting necessary operating parameters, a first drive control device 24 for variable control of the inlet guide vanes 6, a second drive control device 25 for variable control of the diffuser vanes 4 and a third drive control device 26 for controlling the rotational speed of the impeller 2 (i.e. of the turbomachinery).

FIG. 11A is a front view of a base plate having pressure sensing holes formed on a diffuser vane, and FIG. 11B is its cross sectional view. These pressure sensing holes may be disposed on one base plate or one hole on each separate base plate. As shown in FIG. 11, the pressure sensing holes 10a, 10b, 10c are disposed on a disc 10 to which is attached a diffuser vane 4. The hole 10a is for detecting the pressure on the pressure side of the diffuser vane, the hole 10b is for the suction side of the vane and the hole 10c is for the inlet side for measuring the reference pressure. Each of the pressure sensing holes is provided, respectively, with a pressure sensor $S_1$, $S_2$ and $S_3$ to measure the respective pressures.

The output from the pressure sensing device is input into a computation device 21, as shown in FIG. 10, in which a dynamic pressure DPd of the flow is computed from the value measured by the sensor $S_3$. The processor 21 computes a pressure difference ($P_1-P_2$) from the measured values at the pressure sensors $S_1$ and $S_2$, and determines an operating angle of the diffuser vanes on the basis of a ratio $\xi$ which is given by an expression $(P_{1-2})DPd$.

In the first place, the dynamic pressure DPd is obtained by the method shown below.

The radial velocity component $Cm_2$ at the impeller exit is given by the following expression:

$$Cm_2 = (1/P_r)^{1/\kappa} \cdot Q/(\pi D_2 b_2 B) \tag{22}$$

where $P_r$ is pressure ratio ($P_r=P_3/P_i$) of the impeller and $\kappa$ is a specific heat ratio of the fluid, Q is the flow rate and B is the blockage factor at the impeller exit.

The tangential velocity component $Cu_2$ is given by:

$$Cu_2 = \sigma U_2 - Cm_2 \cot \beta_2 \tag{23}$$

where $\sigma$ is a slip factor of the impeller, $U_2$ is the tip speed of the impeller and $\beta_2$ is the blade angle at the impeller exit.

Therefore, the absolute velocity C at the impeller exit is given by:

$$C^2 = Cm_2^2 + Cu_2^2 \tag{24}$$

The fluid density $\rho_2$ at the impeller exit is given by:

$$\rho_2 = \rho_1(P_r)^{1/\kappa} \tag{25}$$

where $\rho_1$ is the fluid density at the impeller inlet. Therefore, the dynamic pressure DPd is given by:

$$DPd = C^2/2\rho_2 \tag{26}$$

and it follows that $\xi$ is given by the following expression.

$$\xi = (P_1-P_2)/DPd \tag{27}$$

The value of $\xi$ with respect to the flow angle is predetermined in wind tunnel. FIG. 13 shows one example, where the x-axis represents the vane angle with respect to the fluid flow and the y-axis represents the ratio $\xi$ as defined above, which is a ratio of the pressure difference between $S_1$ and $S_2$ to the dynamic pressure DPd (this is obtained by measuring the difference between the overall pressure of the flow Pt and the static pressure Ps, which is a general method different from the one presented above). The curve is memorized in the memory section, and the vane angle with respect to the flow is computed from the ratio $\xi$ at the exit of the impeller.

In the meantime, because the flow angle at the impeller exit is give by:

$$\alpha = \arctan(Cm_2/Cu_2), \tag{28}$$

therefore, the difference between the two produces the diffuser vane angle with respect to the flow. By adjusting the vane angle by the amount of the difference, it is possible to align the diffuser vane angle to the exit flow angle of the impeller. If it is not possible to match the angle with one try, the steps are repeated until the coincidence is obtained.

Figure 14:
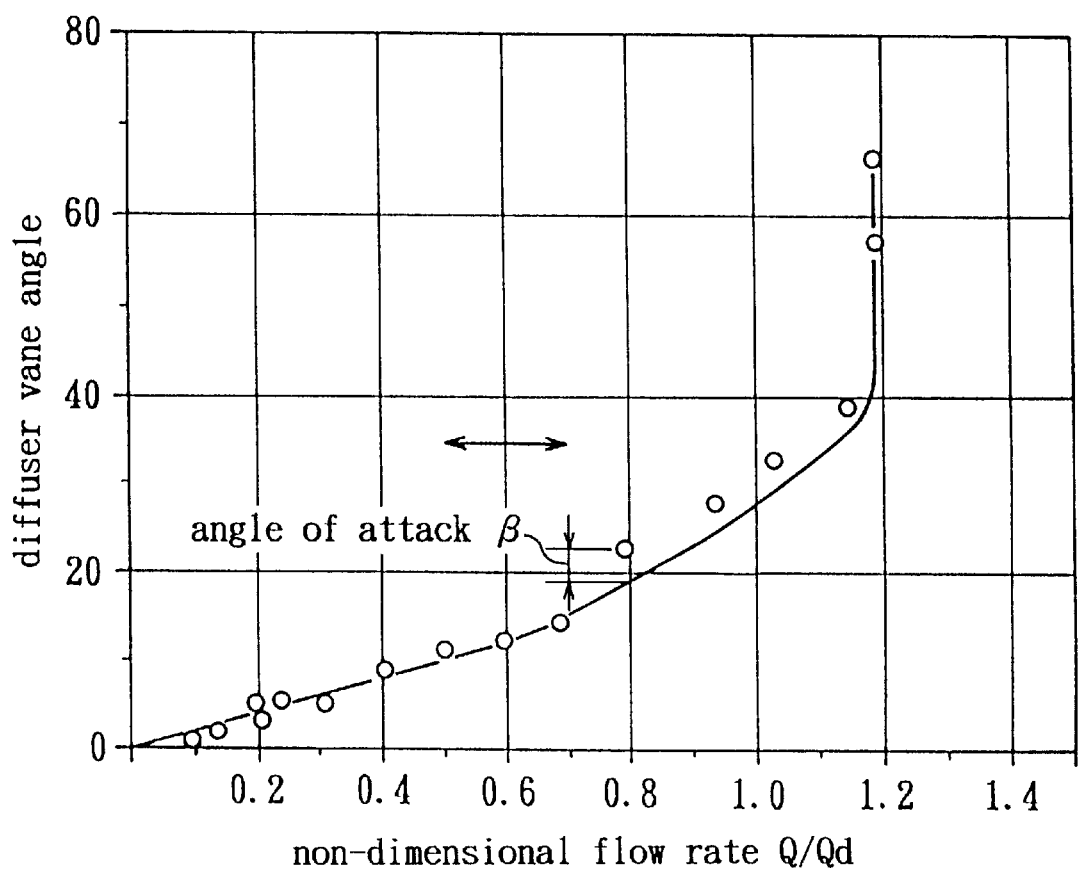
FIG. 14 is a graph showing a relationship between the non-dimensional flow rate and the setting angle of the diffuser vanes.

Controlling of the diffuser vanes can be performed as shown in FIG. 14, for example. This graph is obtained from the data acquired on some compressor, and the x-axis refer to non-dimensional flow rate obtained by normalizing the operating parameter data with the value at the design point, and the y-axis refer to the diffuser vane angles according to the present invention.

Figure 1:
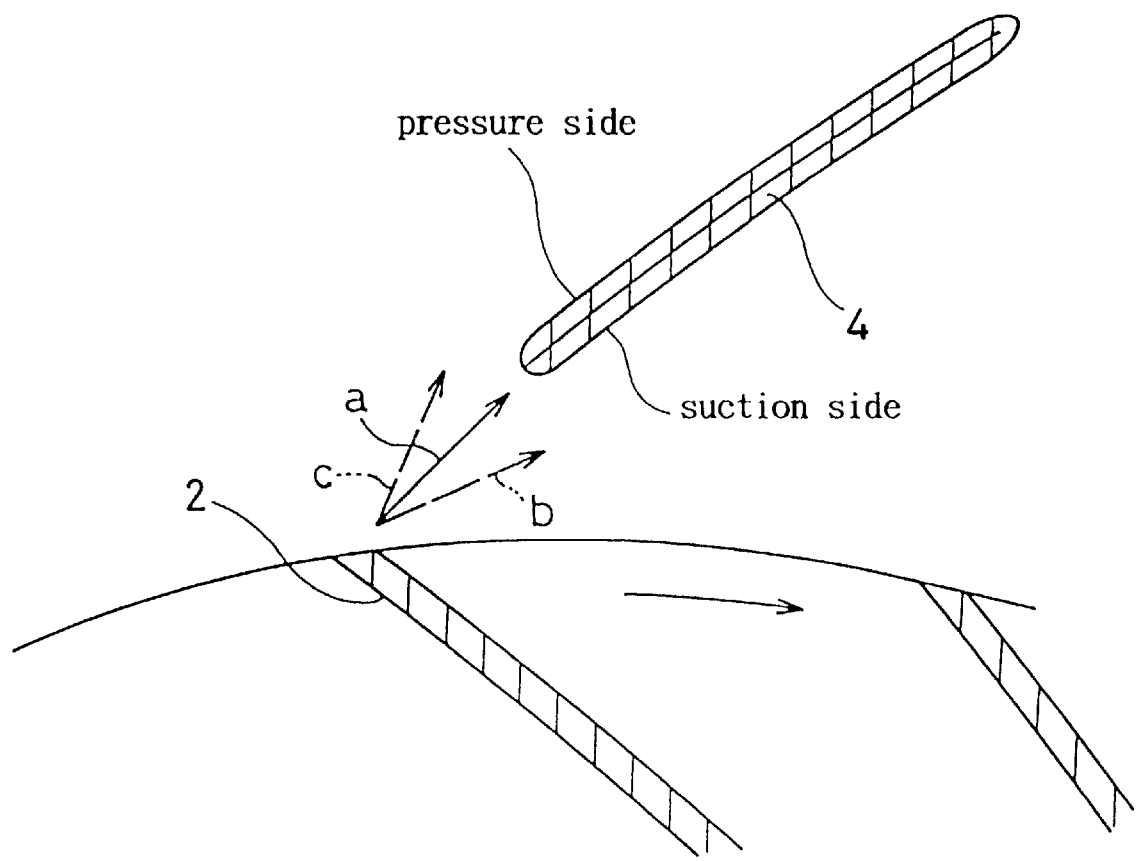
FIG. 1 is a schematic illustration of the fluid flow conditions existing at the exit region of the impeller.
Figure 2A:
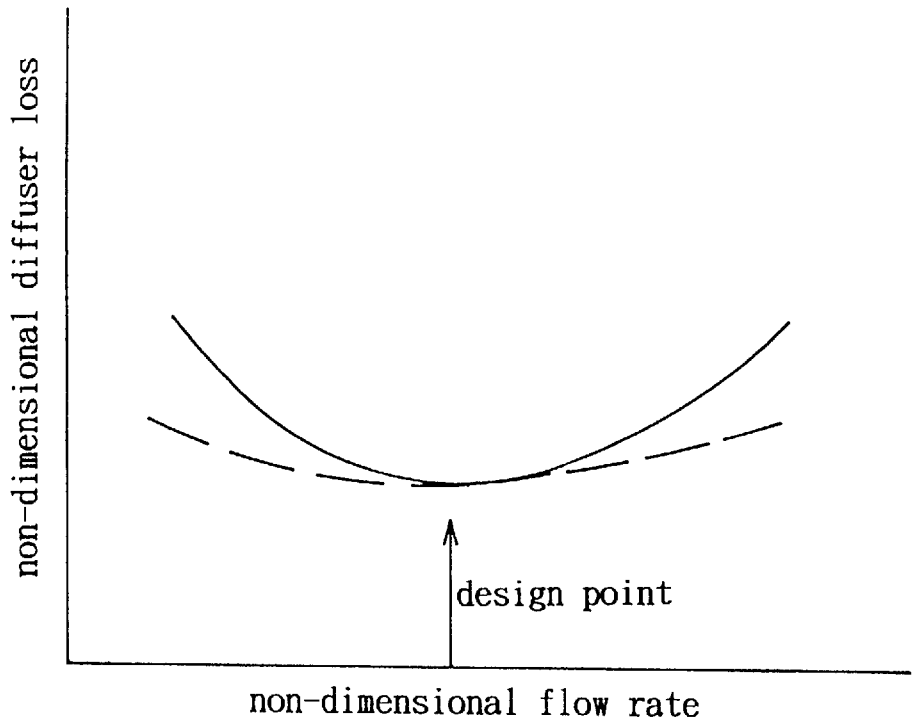
FIG. 2A is a graph showing a relationship between the non-dimensional inlet flow volume rate and the diffuser loss.
Figure 2B:
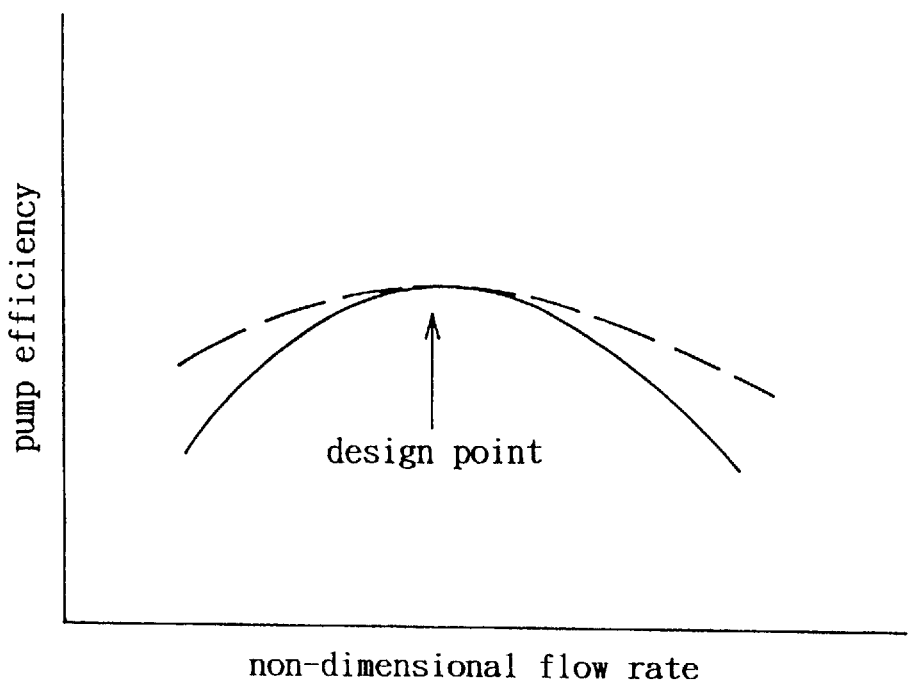
FIG. 2B is a graph showing a relationship between the pump efficiency and the non-dimensional inlet flow volume rate.
Figure 3:
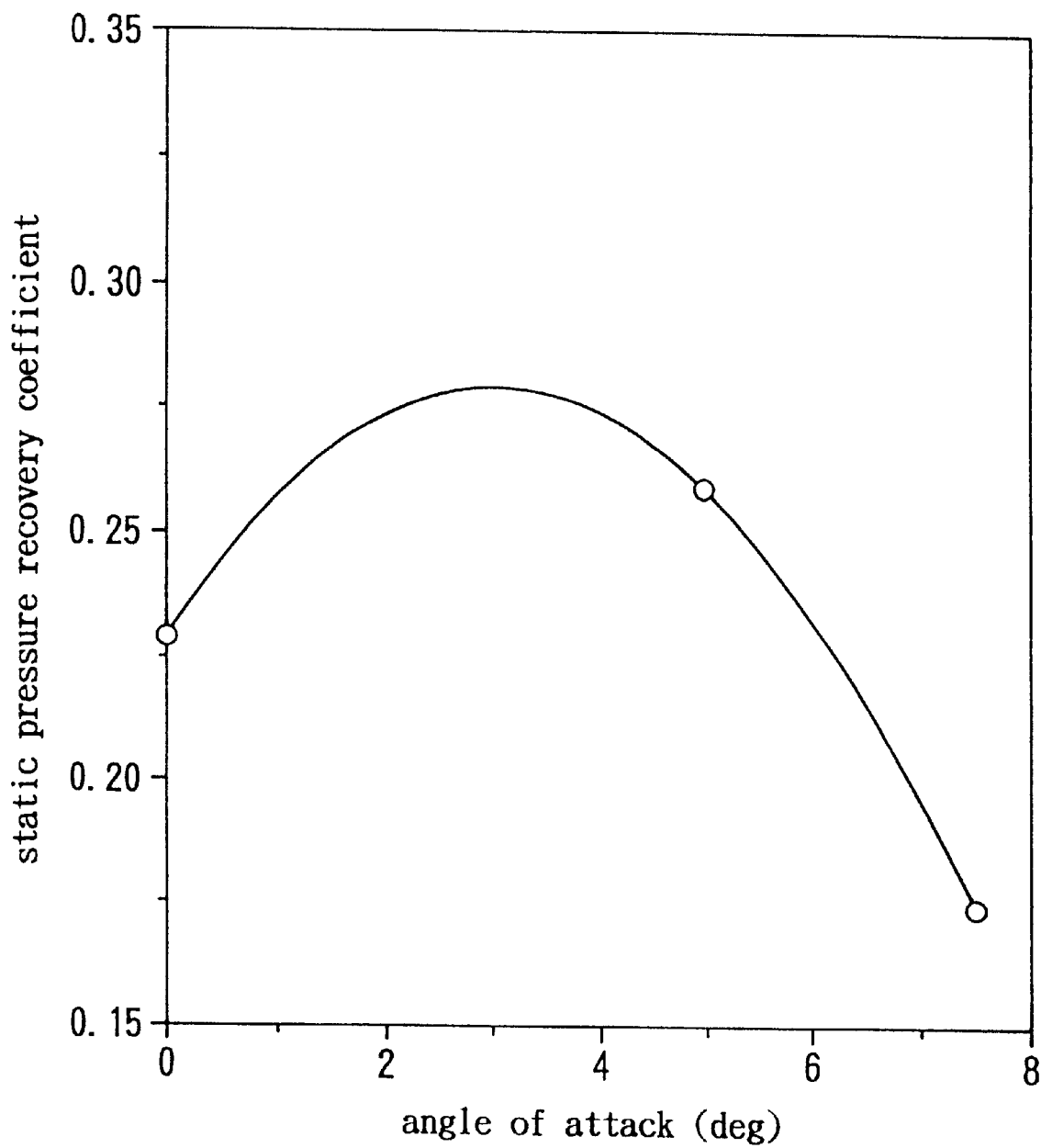
FIG. 3 is a graph showing the static pressure recovery coefficient at the diffuser section and the angle of attack against the diffuser vanes.
Figure 6:
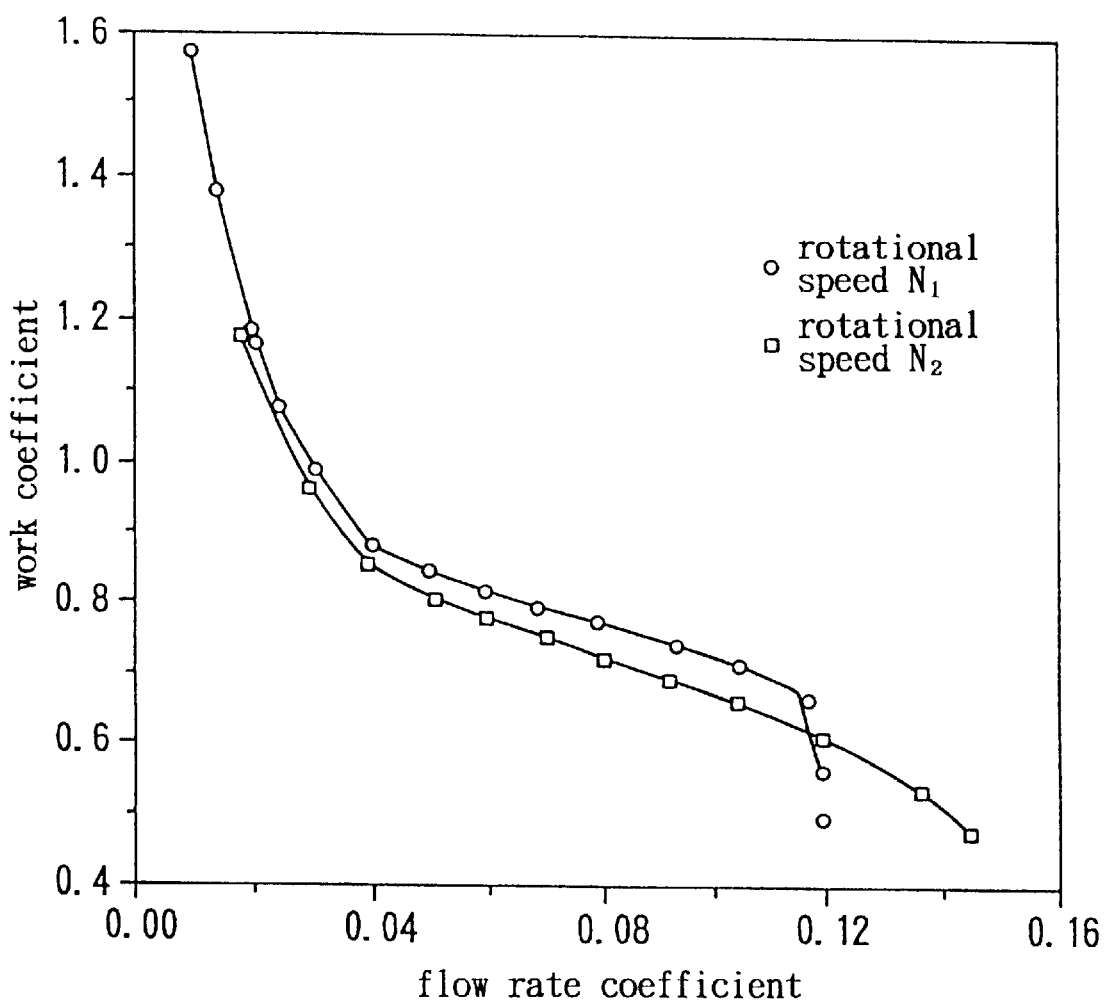
FIG. 6 is a graph shown a relationship between the flow rate and the work coefficient.

In FIG. 14, at non-dimensional flow rates higher than 0.6, the vane angles were determined by computing the dynamic pressure DPd, obtaining the ratio $\xi=(P_1-P_2)/DPd$ of the difference $(P_1-P_2)$ of the pressure measurements obtained from the pressure sensor $S_1$ and $S_2$. From this value, an exit flow angle $\alpha$ is determined and angle of attack $\beta$ (refer to FIG. 12) is added thereto through the computation by the processor 21, and the diffuser vanes 4 are set by the second drive control device 25. Here, $\beta$ is obtained as an angle of attack where a lift coefficient becomes equal to a maximum lift coefficient multiplied by a certain rate (refer to FIG. 3).

In FIG. 14, in the region below the non-dimensional flow rate of 0.6, the turbomachinery is controlled by connecting the pressure sensing hole 10c shown in FIG. 11 to the dynamic pressure measuring device, and obtaining the fluctuation values Fp over a small measuring interval of time, and comparing this value with the threshold value Fpd, and controlling the diffuser vanes 4 by means of the second drive control device 25 so that the fluctuations over a sampling duration would be less than the threshold value Fpd.

Figure 15:
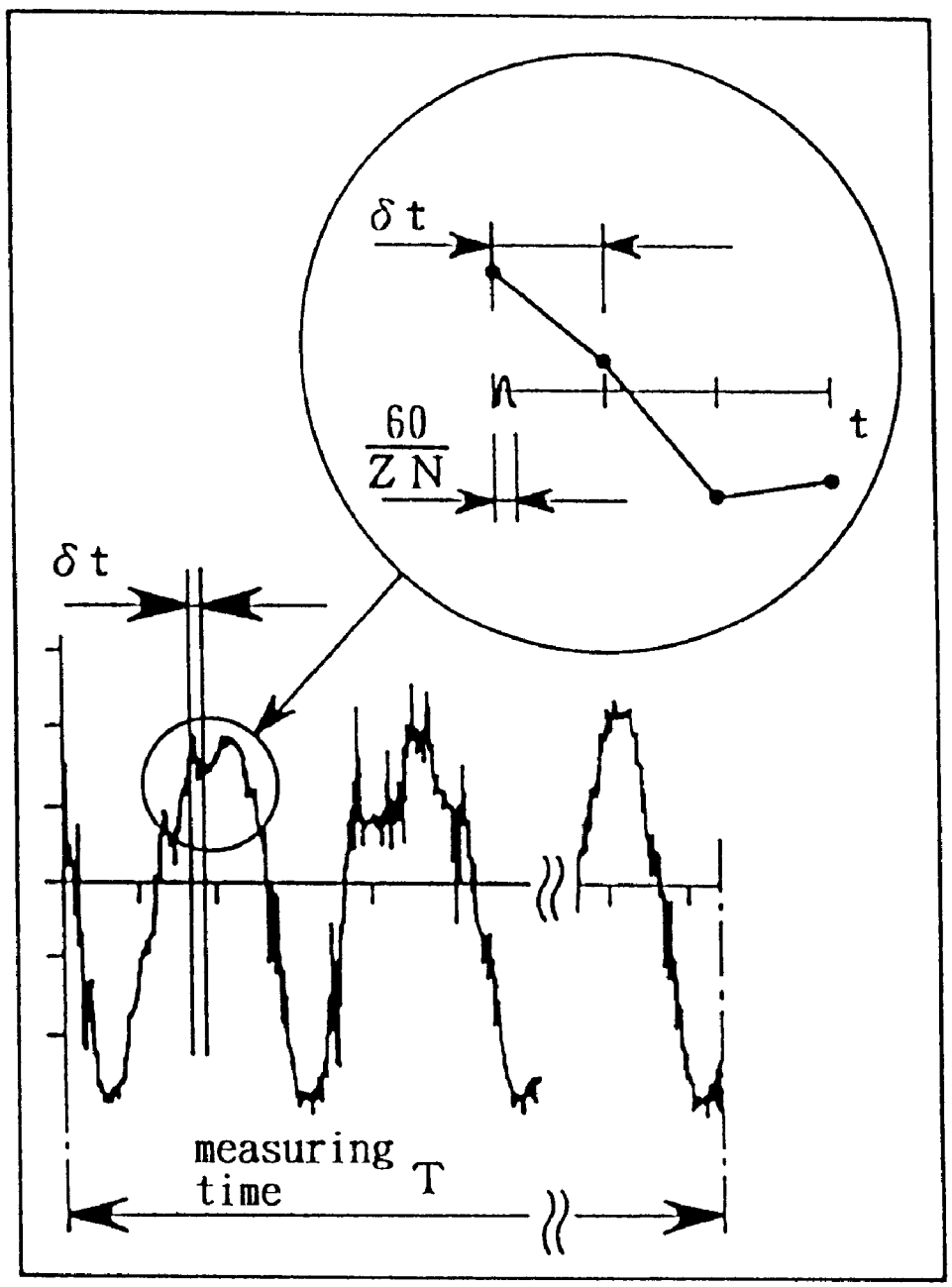
FIG. 15 is a graph showing a method of obtaining pressure variations in a turbomachinery of the present invention having variable fluid guide vanes.

A method of obtaining Fp will be explained with reference to FIG. 15. In this figure, T represents a small measuring interval of time for determining a value of one fluctuation, and $\delta t$ refers to a sampling duration for sampling a pressure value Pi (Q, t) for determining a value of fluctuation. The values of Fp and Fpd are standard deviation per unit time within the measuring interval of time T at the sampling duration $\delta t$, and are given by the following equations.

$$Fp(Q)=[1/T\Sigma\{Pi(Q,t)-Mi(Q)\}^2]^{1/2} \quad (29)$$

where $$Mi(Q)=1/T\Sigma Pi(Q,t) \quad (30)$$

The above equations are applicable to both DC data (i.e. having an offset datum line), or AC data varying above and below the zero line.

The measuring interval of time T should be sufficiently short so as to compute an index of fluctuation to enable accurate and quick response to the current operating condition. In a third embodiment, a guide to the measuring interval of time T is obtained by a formula 60/ZN (in seconds) where N is the rotational speed (revolutions per minute) of the impeller 8 and z is the number of vanes of the impeller 8. Therefore, the quantity 60/ZN indicates a period of fluctuation of an operating parameter, such as the pressure, generated inherently by two revolutions of the impeller. The parameter T should be chosen large enough that the measurements would not be affected by such inherent fluctuations of the system. The limit on T is therefore given by:

$$T \leq K_1 \cdot 60/ZN \quad (31)$$

and it follows that, in practice, T should be selected to be at the minimum limit of the value given by the above relation, where $K_1$ is a constant dependent on the type of turbomachinery being used, and it can be determined beforehand at the time of testing the turbomachinery, or if the machine of the system is a high volume production unit, then a representative value should be entered in the data input device 23.

Next, a method of determining the sampling duration, δt, will be presented. It is desirable that this quantity should be as short as possible from the viewpoint of computing an accurate index of the control constant, however, excessively short sampling duration will load the computer, and the computation time becomes undesirably excessive. In this embodiment, a guide to the sampling duration δt is again calculated on the basis of the formula 60/ZN (in seconds). Therefore, the sampling duration δt should be chosen so as not to be affected by the inherent operating property generated by the revolution of the impeller 2. The result is given by the following:

$$\delta t \leq K \cdot 60/ZN \quad (32)$$

Figure 7A:
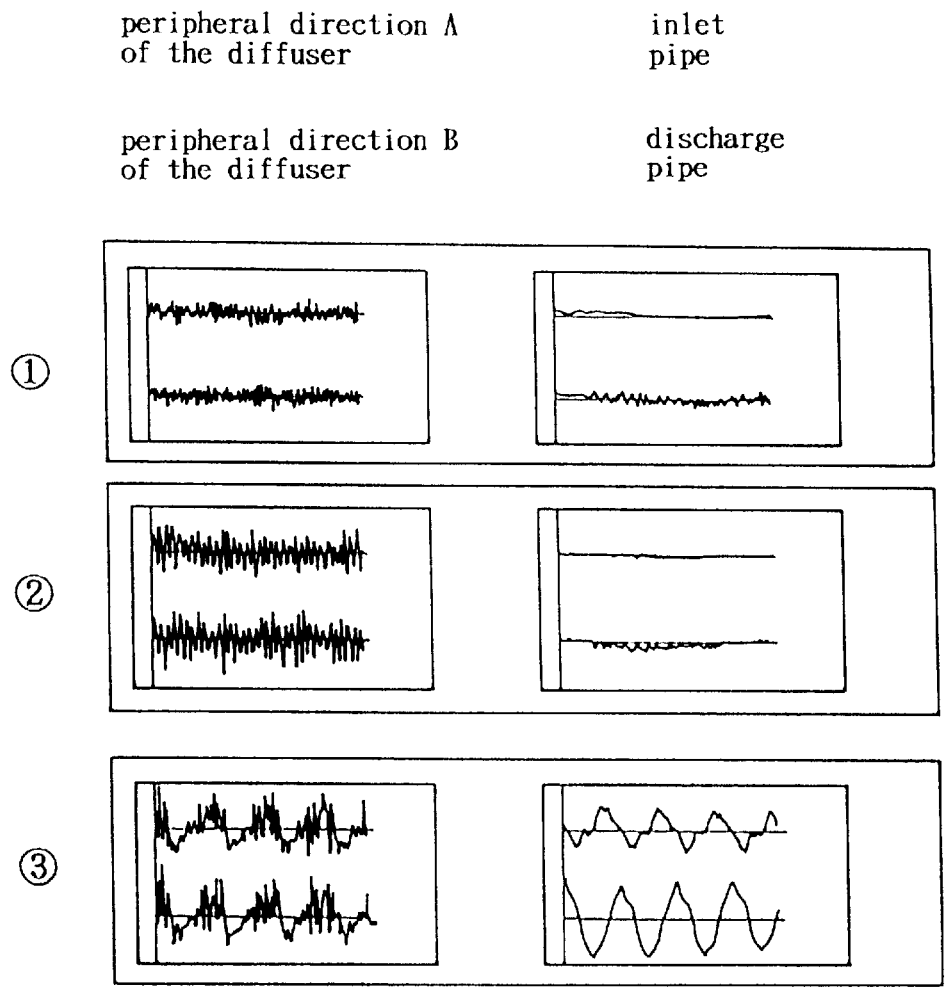
FIGS. 7A and 7B shows pressure fluctuations in various sections of the pump.
Figure 7B:
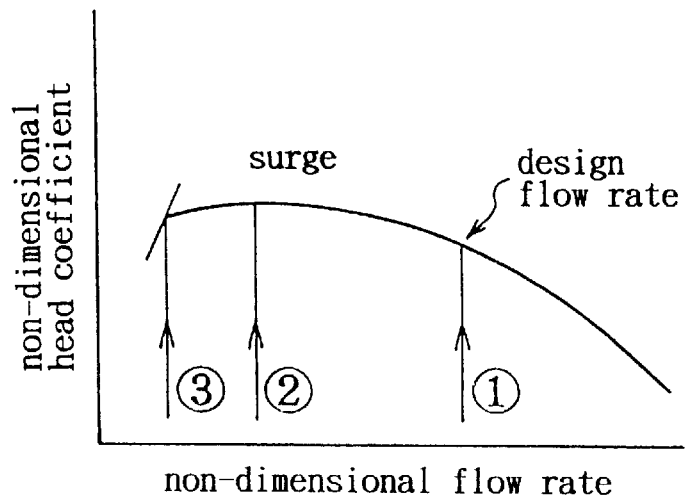

Furthermore, as explained with reference to FIG. 7, by comparing the vibrational period during the design flow rate 1 with those during the lesser flow rates 2 and 3 at which operational instability is generated in the system, it is evident that duration should be altered depending on the flow rate. In this embodiment, the sampling duration δt in the instability region of flow rate 2, in which the head coefficient becomes higher towards low flow rates, is determined by $K_2 \cdot 60/ZN$. In the flow rate 3 in which surge is generated, the sampling duration δt is $K_3 \cdot 60/ZN$. Those constants $K_2$, $K_3$ are dependent on the type of turbomachinery, and as in the case of $K_1$, can be determined beforehand at the time of testing the turbomachinery, or if it is a high volume production item, a representative value should be entered in the data input device 23.

The operating parameters of the compressor are determined for each operating system as described above, but the onset of instability, i.e. surge threshold value γ for the operating system is determined as explained in the following.

FIG. 16 shows the data from the present investigation, and the x-axis represents non-dimensional flow rates Q normalized by dividing the operating flow rate by the design flow rate Q, and the y-axis represents non-dimensional operating pressure fluctuations Fp normalized by the design pressure Fpd at the design flow rate Qd. In FIG. 16, circles represent the pressure measurements obtained at the diffuser wall.

The operating conditions were as follows:

$N=9{,}000 rpm;\ Z=17;\ K_1=2{,}000;\ K_2=5;$ and $K_3=20$.

From these results, it can be seen that when the non-dimensional flow rate falls below 0.6, the non-dimensional pressure fluctuations begin increasing. It is clear that the stable operation of the compressor can be achieved by maintaining the pressure fluctuation below this threshold value. In this example, Fp/Fpd=1.5 is judged to be the limit, and a value of 1.5 is used as the threshold value γ.

Next, the diffuser vane angle is adjusted so that the system is maintained below the threshold value at each respective flow rate to obtain the type of relation (non-dimensional flow rate less than 0.6) shown in FIG. 14. The data show that, at low flow rates below the non-dimensional flow rate 0.6, the diffuser vane angle is proportional to the non-dimensional flow rates.

For producing an optimum operating condition for the diffuser vanes 4, the above steps are combined with the inlet flow volume rate at the pump and any rise in the head coefficient computed by the computation device 21, to control the diffuser vane angle by means of the second drive control device 25.

Figure 17:
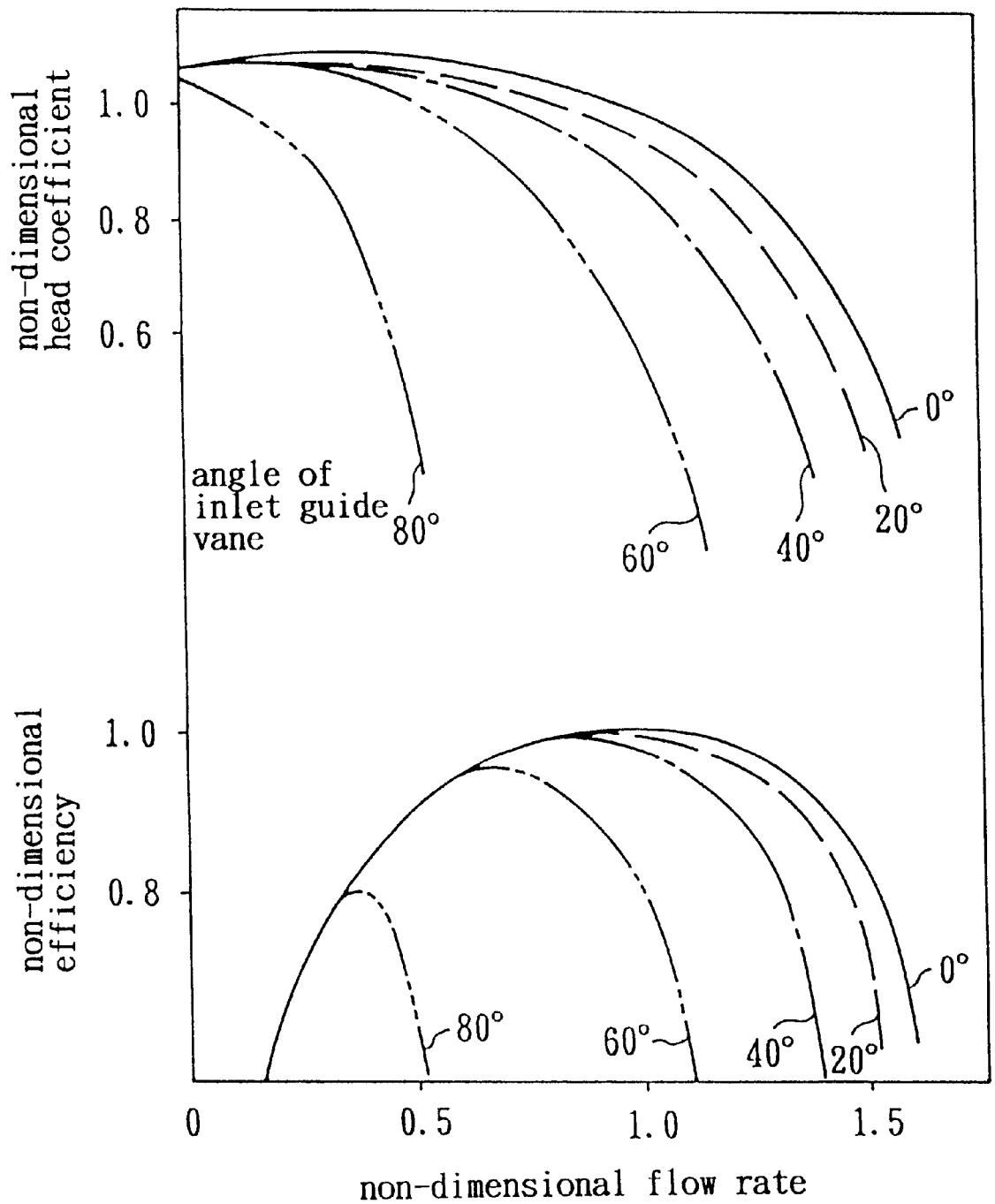
FIG. 17 is a graph showing a relationship between the non-dimensional flow rate and the head coefficient in a turbomachinery of the present invention.

FIG. 17 shows an example of the performance of a centrifugal compressor having the diffuser vane control device of the present invention. The x-axis represents the non-dimensional flow rate, and the y-axis represents non-dimensional pressure coefficient for the top graph and non-dimensional efficiency for the bottom graph. It has thus been confirmed that the device permits a stable operation of the pump over a wide range of flow rates.

Figure 18:
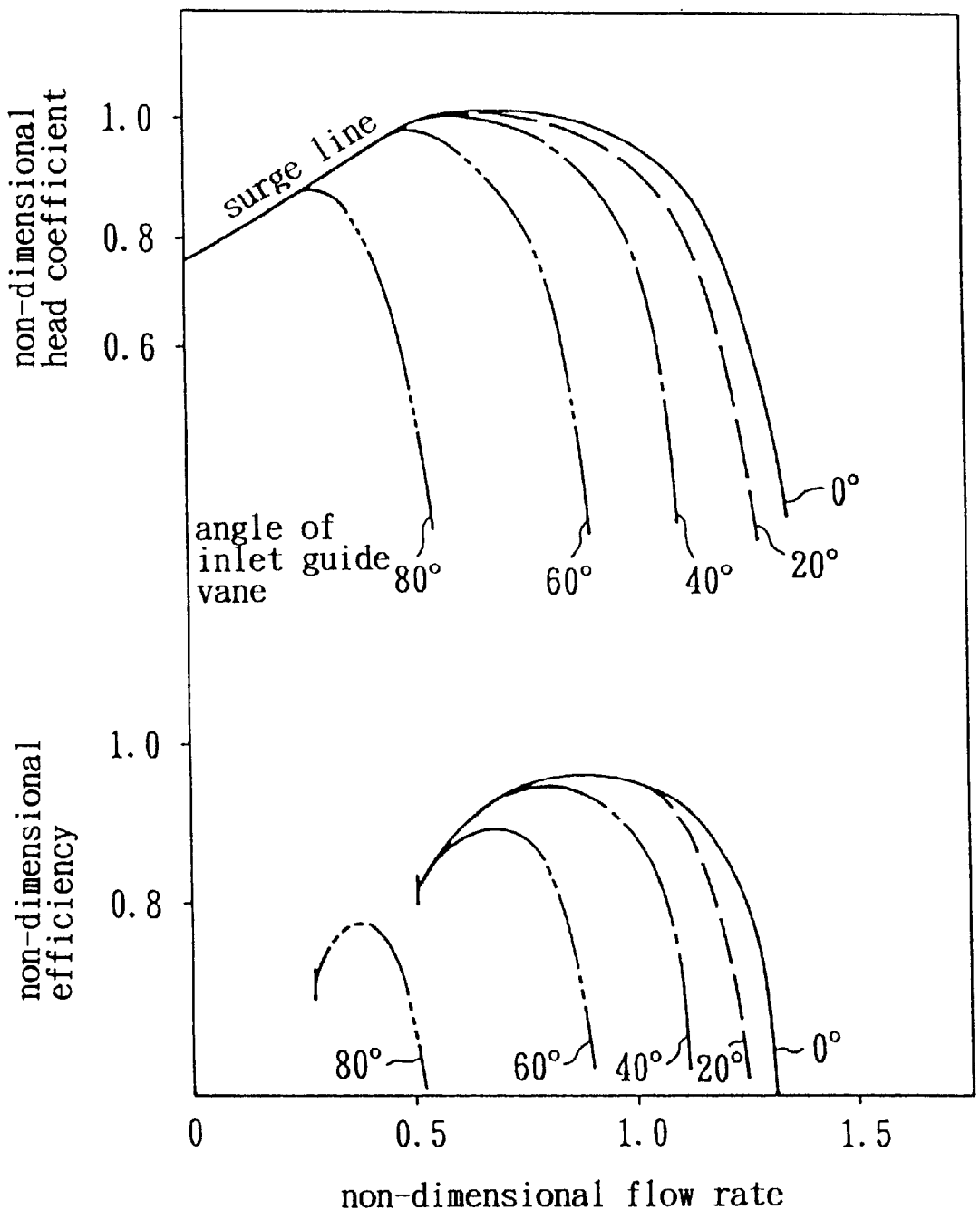
FIG. 18 is a graph showing a relationship between the non-dimensional flow rate and the head coefficient in a conventional turbomachinery.

FIG. 18 shows overall performance curves of a centrifugal compressor having fixed diffuser vanes and variable-angle inlet guide vanes. It is clear, from the comparison of the performance curves of the present turbomachinery shown in FIG. 17 to those shown in FIG. 18, that there is a significant improvement in the performance at both low and high flow rates. In the case of a pump, even if the rotational speed is changed, the non-dimensional performance curves remain essentially the same.

In the embodiments shown in FIGS. 8 to 17, the computational processor 21 is provided as a separate unit, however, it is permissible to provide a plurality of dedicated processors according to their functions. Also, the drive control devices have been provided separately, however, it is clear that a single drive control device may be sufficient.

Figure 19:
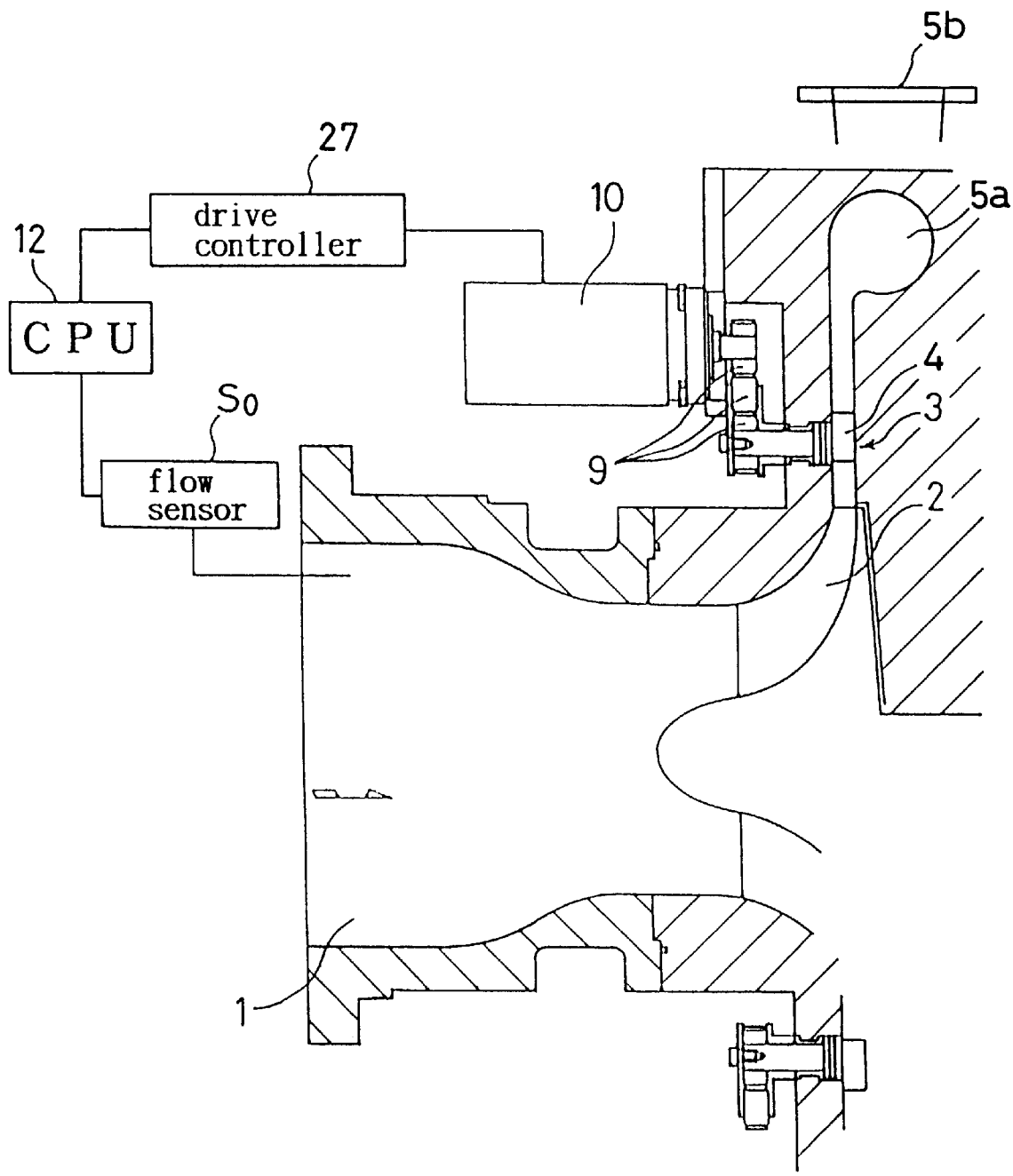
FIG. 19 is a cross sectional view of another embodiment of a turbomachinery having variable-angle vanes for a single-stage centrifugal compressor.

FIG. 19 refers to a single-stage centrifugal compressor of another embodiment, and the fluid flowing into the compressor through the inlet pipe 1 is given motion energy by the rotating impeller 2, is sent to the diffuser 3 to increase the fluid pressure, and is passed through the scroll 5a, and discharged from the discharge pipe 5b. The shaft of the impeller is connected to a motor. The inlet pipe 1 is provided with a flow sensor $S_0$, and its output signal is input into a CPU 12. The diffuser 3 is provided with diffuser vanes 4 which are also connected to an actuator 10 through a transmission device 9. The actuator 10 is provided with a control device 27 which is controlled by CPU 12.

Figure 12:
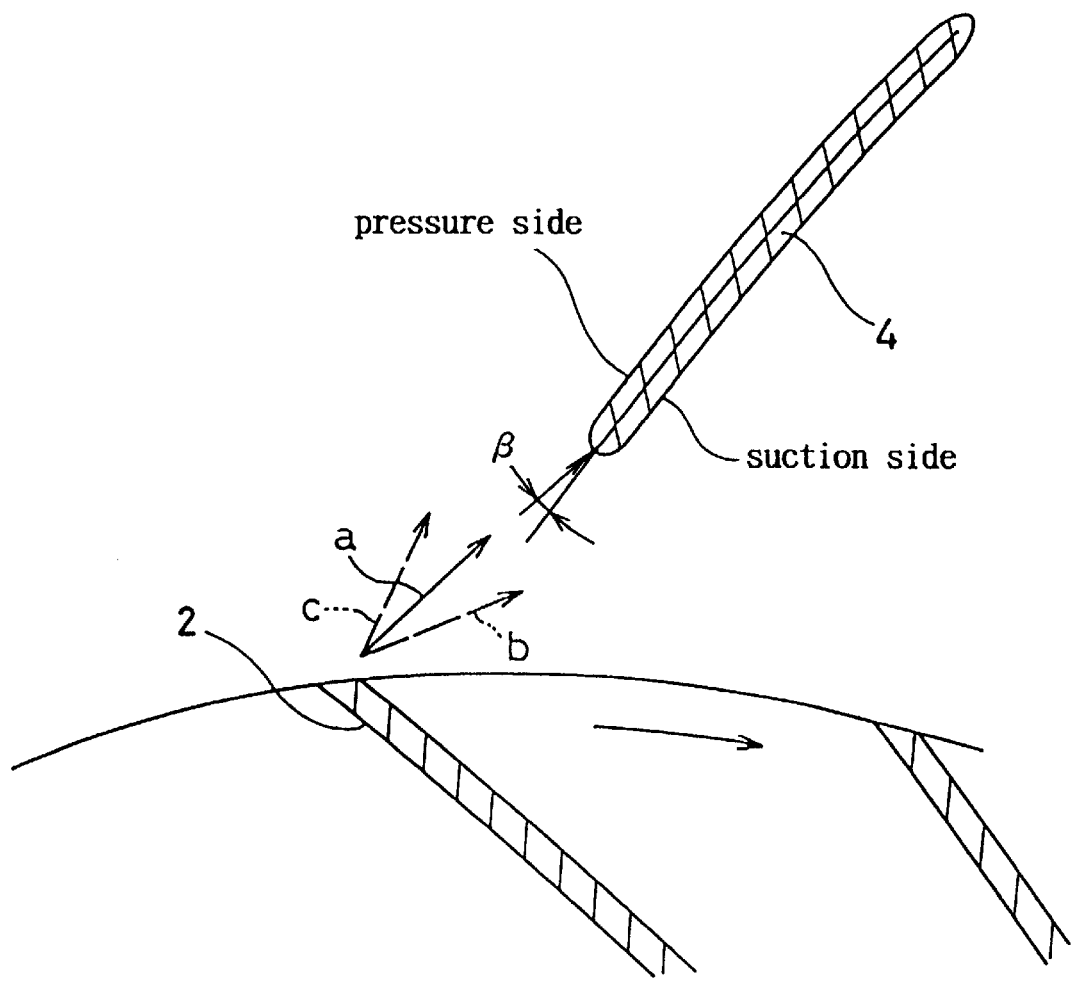
FIG. 12 is a schematic illustration of the fluid flow conditions existing at the exit region of the impeller.
Figure 20:
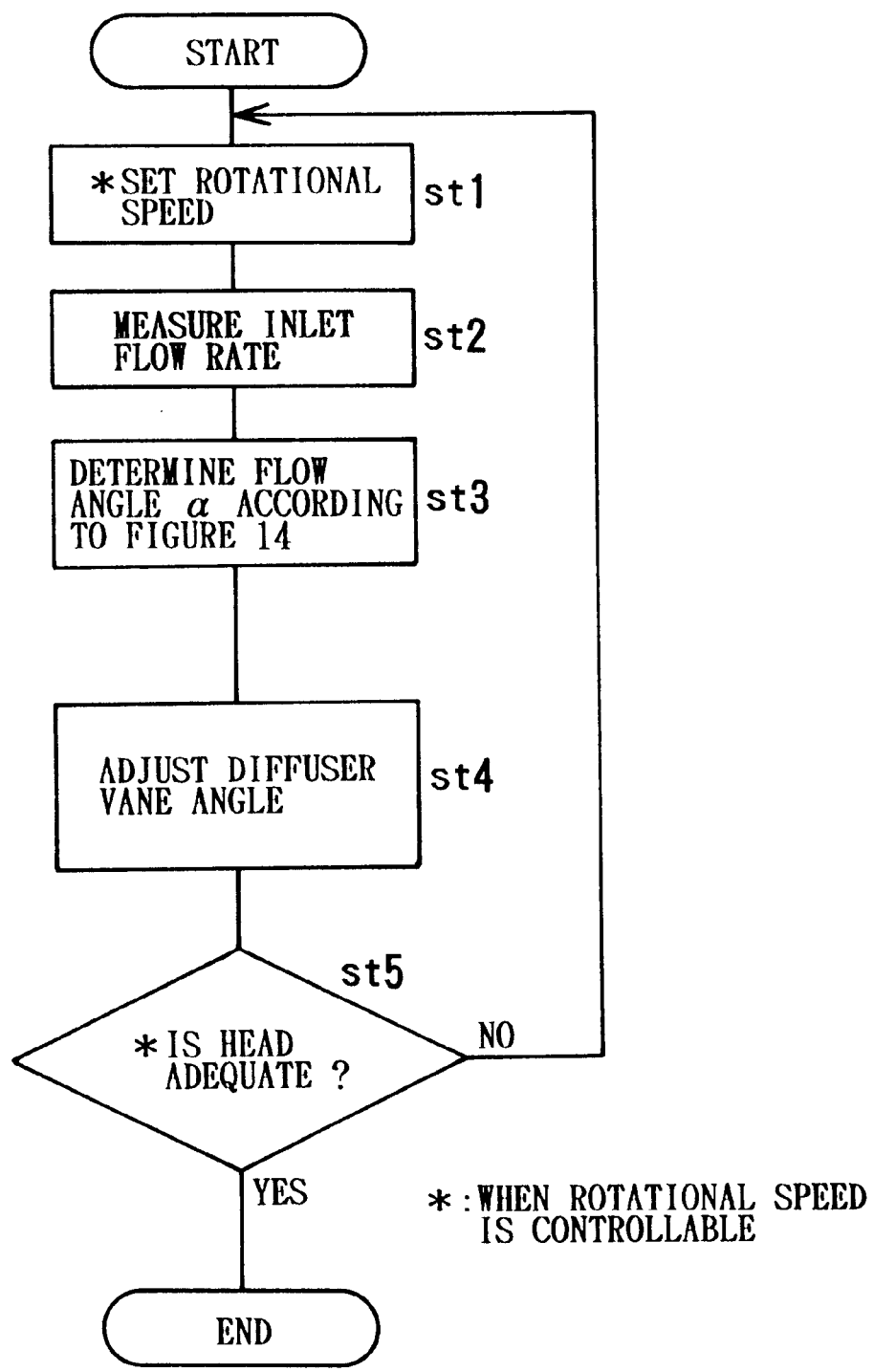
FIG. 20 is a flowchart showing the processing steps of the turbomachinery with the variable fluid guide vanes shown in FIG. 19.

FIG. 20 is a flowchart showing the process steps of the turbomachinery having variable-angle inlet guide vanes shown in FIG. 19. When the rotational speed is to be altered, this is performed in step 1. If it is not necessary to change the rotational speed, next step is reached. Next, in step 2, inlet flow volume rate Q is measured, and in steps 3, the flow angle a is determined according to FIG. 14. In step 4, the diffuser vane angle is adjusted as shown in FIG. 12 by operating the actuator 10. When the rotational speed is adjustable, in step 5, it is examined whether the head value is at a desired value, and if it is not, the process returns to step 1. If the head exceeds the target value, the operation is continued. The above process enables the turbomachinery a stable and high performance operation by controlling the diffuser vane angle in accordance with the measured value of the inlet flow volume rate.

Figure 21:
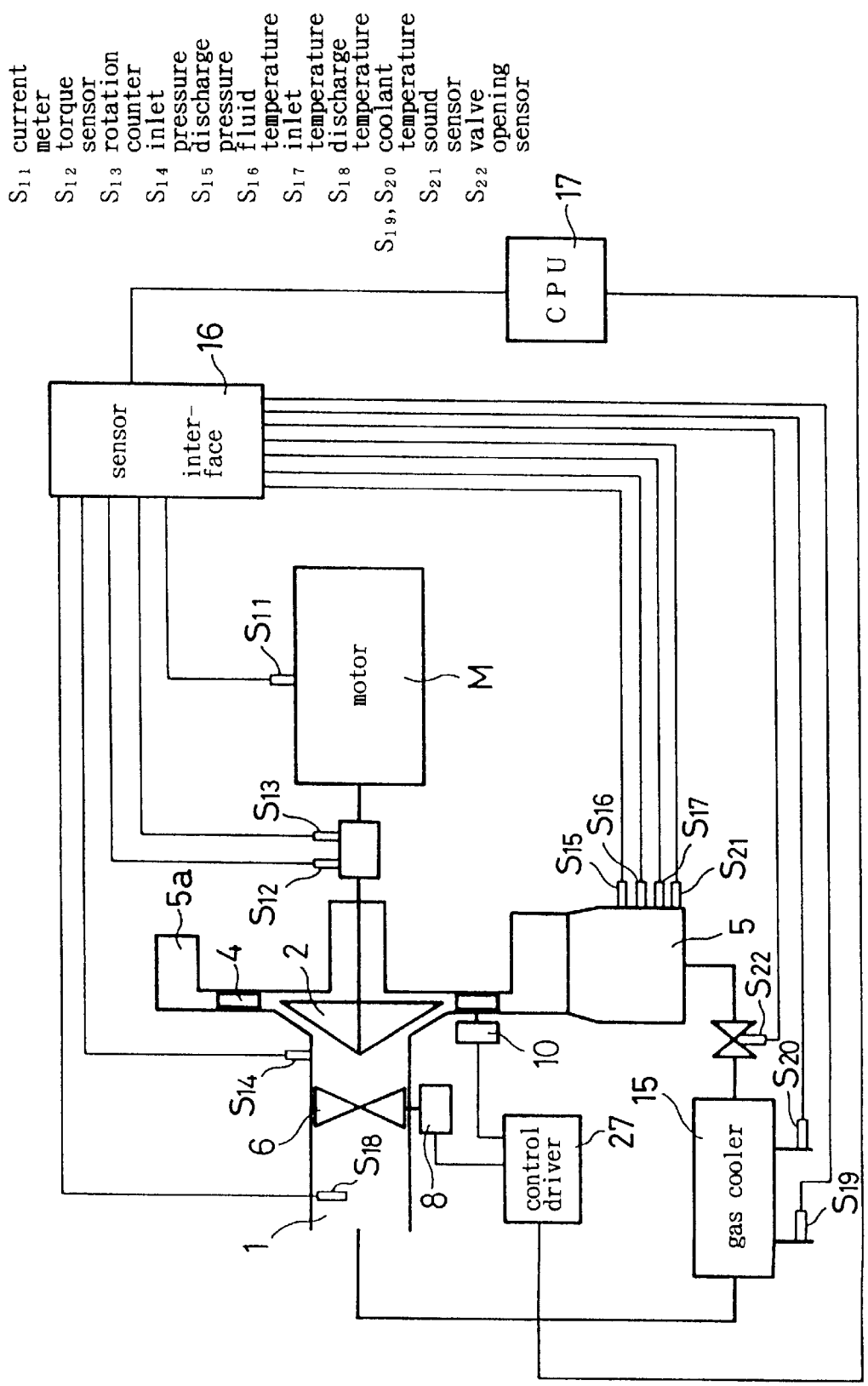
FIG. 21 is a flowchart showing the processing steps, including the control system, of another embodiment of the turbomachinery with the variable fluid guide vanes.
Figure 22:
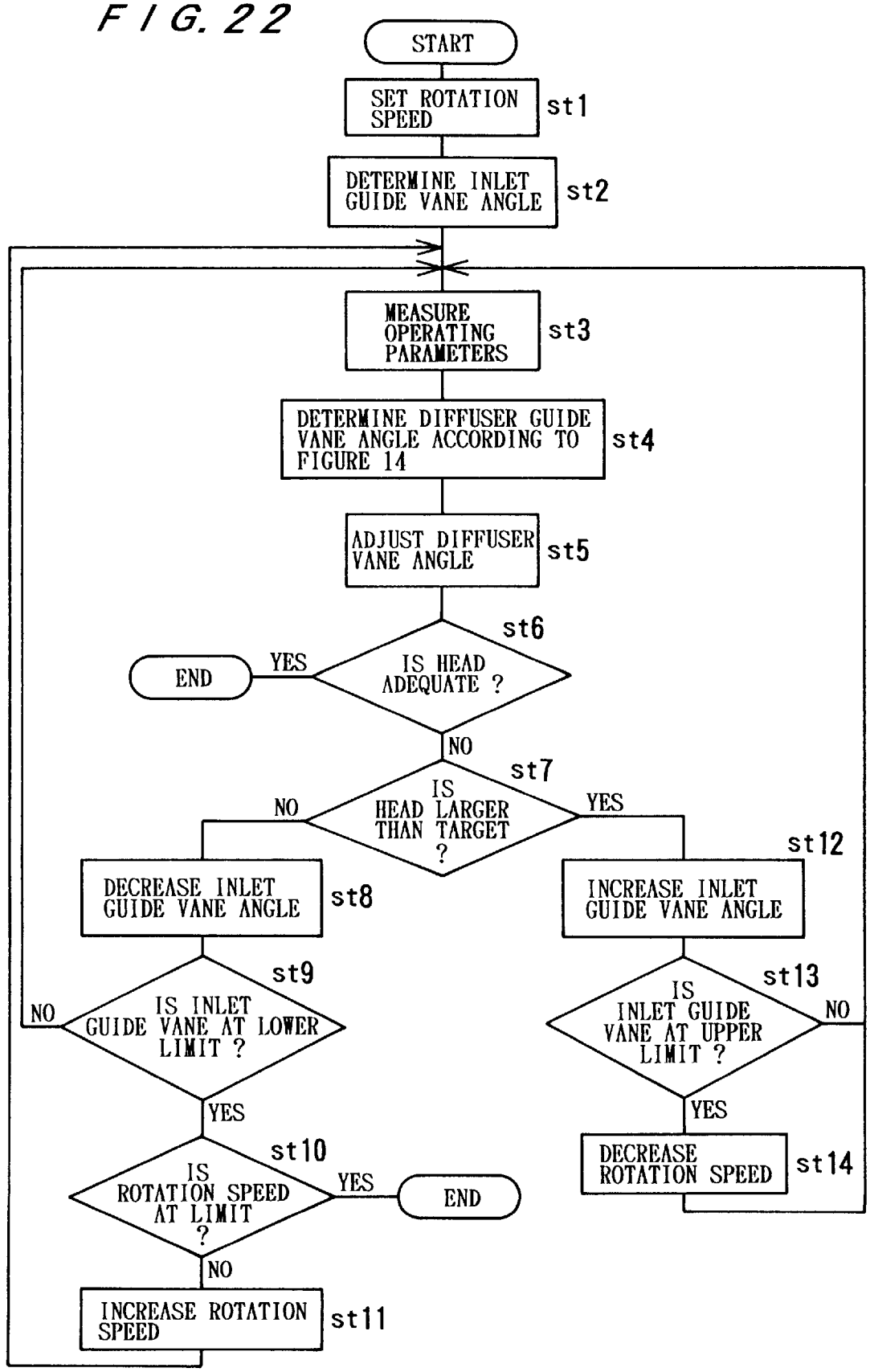
FIG. 22 is a flowchart showing the processing steps of the turbomachinery with the variable fluid guide vanes shown in FIG. 21.
Figure 23:
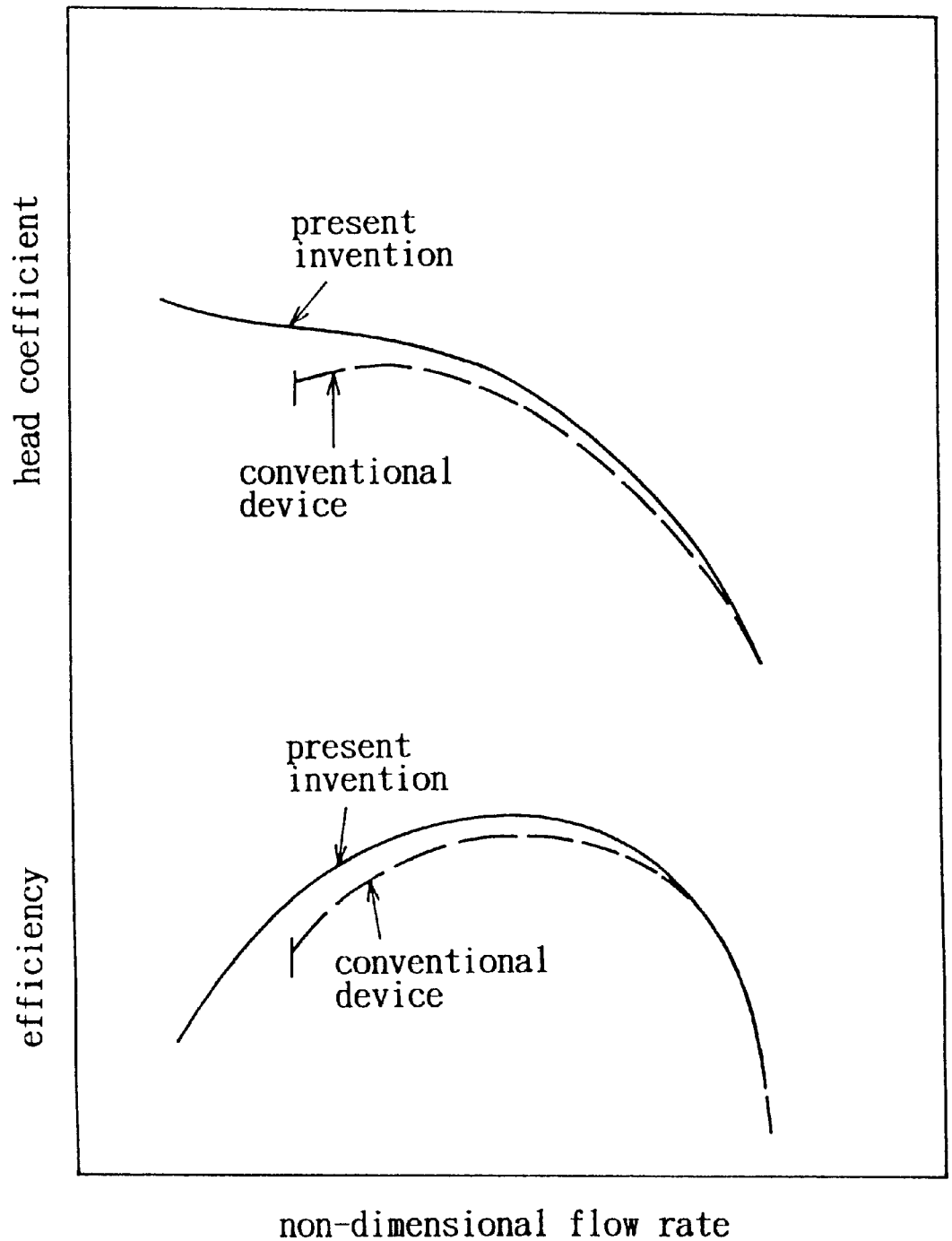
FIG. 23 is a graph to show the effects of the turbomachinery shown in FIG. 21.

FIGS. 21 to 23 show another embodiment of the present invention of turbomachinery. The construction of the turbomachinery differs from that embodiment shown in FIG. 19 such that a plurality of fan-shaped inlet guide vane is disposed around the periphery on the inlet pipe 1, and the actuator 8 is connected to these vanes. There is also a gas cooler 15 to provide cooling to the fluid for the compressor. The compressor is provided with various sensors, such as a current meter $S_{11}$ for the detection of input current to the electrical motor, a torque sensor $S_{12}$ and a rotation counter $S_{13}$ for the impeller shaft; an inlet pressure sensor $S_{14}$ disposed on inlet pipe 1 for detection of inlet pressures; and $S_{15}$~$S_{18}$ disposed on exit pipe 1 for measuring, respectively, the discharge pressures, and fluid temperatures; cooler temperature sensors $S_{19}$ and $S_{20}$ for determining the temperature difference between the inlet and exit ports in the gas cooler 13; sound sensor $S_{21}$; and valve opening sensor $S_{22}$. These sensors $S_{11}$~$S_{22}$ are operatively connected to a sensor interface 16 through which the output sensor signals are input into CPU 17.

FIG. 22 is a flowchart showing the process steps of the turbomachinery having variable-angle inlet guide vanes. In step 1, the rotational speed of the impeller 2 is set to a suitable value not exceeding a predetermined limit. Next, in step 2, the angle of the inlet guide vanes 6 is determined from the input data such as the rotational speed N of the impeller 2, target flow rate Q and head coefficient H. In steps 3, operating parameters are measured. In step 4, using a relation shown in FIG. 14, the angle of the diffuser vanes is determined.

In step 5, the drive control device and the actuator are operated to control the angle of the inlet guide vane. In step 6, the current head is examined to see if it is at a desired value, and when it is at the desired value, the operation is continued. When the head value is not at the desired value, in step 7, the magnitude of the current head value is compared with the desired value, and, when the current head value is less, in step 8, the angle of the inlet guide vanes 6 is decreased.

Next, in step 9, the magnitude of the inlet guide vane angle is examined to see if it is at the lower limit, and if the answer is NO, then the program returns to step 3 and all the subsequent steps are repeated. If the answer is YES, the rotation speed is examined to see if it is at the limit, and if the answer is YES, then the operation is continued. In this case, the target head value is not obtained. If the answer is NO, then in step 11, the rotational speed is increased (by a predetermined amount), and the program returns to step 3 and all the subsequent steps are repeated.

In step 7, when the head value is judged to be higher than the desired value, in step 12, the angle of the inlet guide vane is increased. Next, in step 13, the angle of the inlet guide vane is examined to see if it is at the upper limit, and if the answer is NO, the program returns to step 3 and repeats all the subsequent steps. If the answer is YES, then in step 14, the rotational speed is decreased (by a predetermined amount).

FIG. 23 shows a comparison of the overall performance of a conventional turbomachinery having fixed diffuser vanes is compared with that of the turbomachinery of the present invention. It is clear that the performance of the present system offering a stable operation over a wide flow rate range is superior to the conventional system.

Figure 24:
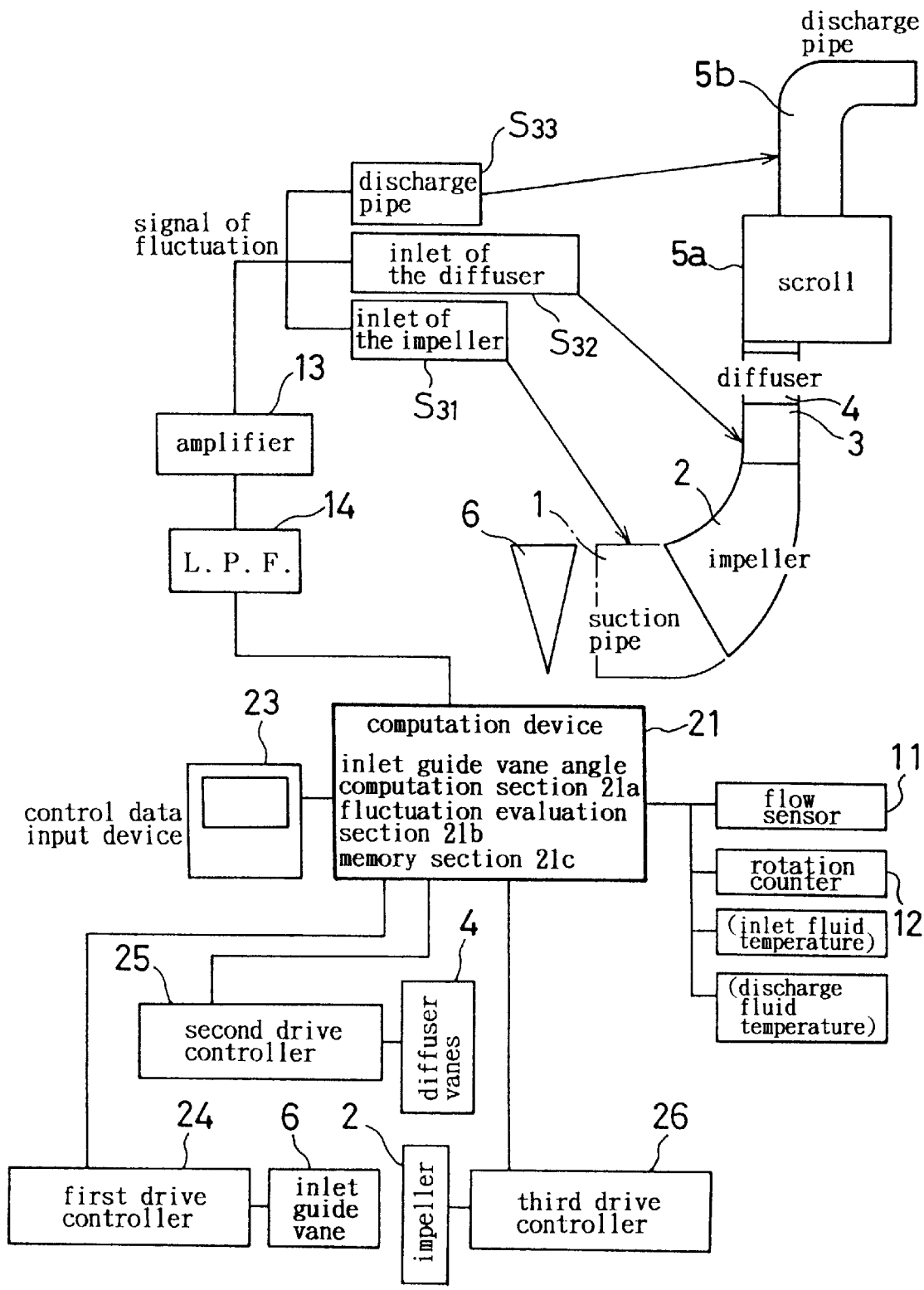
FIG. 24 is a block diagram of a second embodiment of the turbomachinery of the present invention with variable fluid guide vanes.

The next embodiment relates to a turbomachinery having variable inlet guide vanes 6 to provide an optimum performance. The construction of the turbomachinery is identical to those shown in FIGS. 8 and 9. As shown in FIG. 24, the turbomachinery is provided with an inlet pipe 1 having flow sensors 11 for measuring the inlet flow volume rates, and the pipes and the diffusers are provided with pressure sensors $S_{31}$~$S_{33}$. The sensor $S_{31}$ is attached to inlet pipe 7, and the sensor $S_{32}$ is attached to the inlet to the diffuser at two locations. The sensor $S_{33}$ is attached to the exit pipe 9. Rotational speed sensor 12 is provided on the axis of the impeller 2.

As shown in FIG. 24, the turbomachinery with variable inlet guide vanes is provided with a computation device 21 for measuring and computing the rotational speed, inlet flow volume rate and any rise in the head coefficient by using various sections: an inlet guide vane angle computation section 21a to compute the inlet guide vane angle to produce the optimum angle on the diffuser vanes 4; fluctuation evaluation section 21b to compute the values of pressure fluctuation based on the measurements provided by sensors $S_{31}$ to $S_{33}$ during small measuring interval of times and compare current fluctuation with the predetermined threshold value; memory section 21c to store the performance data of the turbomachinery when the inlet guide vanes 6 is fully open. A data input device 23 for entering operational parameters and the constants $K_1$ to $K_3$ (already described by referring to FIG. 15), a first drive control device 24 for controlling the angle of the inlet guide vanes 6, a second drive control device 25 for controlling the angle of the diffuser vanes 4, and a third drive control device 26 for controlling the rotational speed of the impeller 2 are also provided.

The fluctuation signals from the pressure sensors $S_{31}$, $S_{32}$ and $S_{33}$ are input into a signal amplifier 13, and the amplified signal is input into the computation device 21 after passing through a low pass filter (LPF) 14. The output signals from the computation device 21 are input into the first, second and third drive control devices 24, 25 and 26. The functions provided by the separate units such as the amplifier 13 connected to the sensors $S_{31}$~$S_{33}$, filter 14, input interface and computation device 21 may be replaced with a single microprocessor unit. Also, the computation sections 21a, fluctuation evaluation section 21b and memory section 21c may be provided by separate processors.

In the turbomachinery presented above, the optimum operation of the system demanded by the input data from the data input device 23 is produced by computing the angle for the inlet guide vanes 6, controlling the angle of vanes 6, computing the fluctuation values in the fluctuation evaluation section 21b, controlling the diffuser vanes 6 so as to provide optimum performance and by controlling the rotational speed of the turbomachinery.

Figure 25:
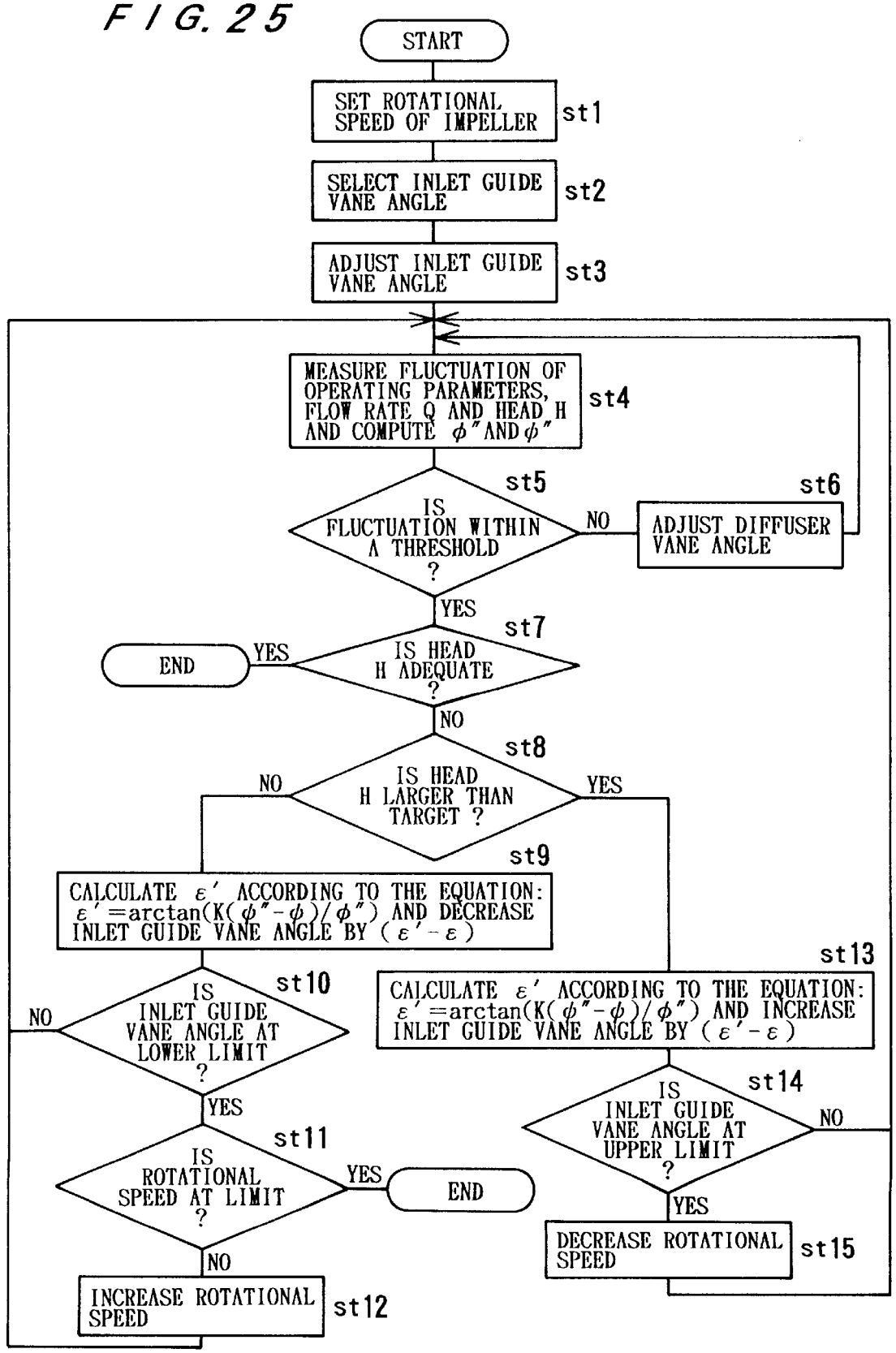
FIG. 25 is a flowchart showing the processing steps of the turbomachinery with the variable fluid guide vanes shown in FIG. 24.

FIG. 25 is a flowchart for producing a stable operation of the turbomachinery by setting the angle of the inlet guide vanes 6 for optimum performance and by controlling the diffuser vanes 4 so as to prevent surge generation. In step 1, the rotational speed of the impeller 2 is set at a suitable value so as not to exceed a certain limit. In step 2, an angle $\epsilon$ for the inlet guide vanes 6 is selected to suit the rotational speed N of the impeller 2, target flow rate Q and head H. This process is performed by the following steps: (1) inputting of the target flow rate Q and head H; (2) computing flow coefficient φ, pressure coefficient ψ; (3) computing a second order curve passing through the points representing the flow coefficient φ, pressure coefficient ψ; (4) computing intersection points, φ' and ψ', of the second order curve with the performance curve, with the inlet guide vanes 6 set at zero; (5) computing the angle ε of the inlet guide vanes according to the following equation.

$$\epsilon = \arctan\{k(\psi' - \psi)/\phi'\} \tag{33}$$

where k is a constant. Equation (33) will be explained further later.

In step 3, the angle of the inlet guide vanes 6 is controlled by operating the first drive control device 24. Next, in step 4, the operating parameters are determined by means of the sensors $S_{31} \sim S_{33}$, and also the flow rate Q and the head H are measured to compute 100 " and ψ". In step 5, fluctuation values in the operating parameters over a small measuring interval of time are determined, and the results are compared with the threshold value, and when the fluctuation exceed the threshold value, then in step 6, the angle of the diffuser vanes 4 is altered by operating the second drive control device 25, and steps 4 to 6 are repeated.

When the fluctuation is less than the threshold value in step 5, then in step 7, the head H is examined if it is at a desired value, and if it is at the correct value, the operation is continued. If the value of the head H is not at the desired value, in step 8, it is determined which is higher. If the head is lower, in step 9, ε' is calculated according to the following equation:

$$\epsilon' = \arctan\{k(\psi'' - \psi)/\phi''\} \tag{34}$$

and the angle of the inlet guide vanes 6 is decreased by a quantity equal to (ε'−ε).

In step 10, the angle of the inlet guide vane is examined to evaluate whether it is at the lowest limit, and if the answer is NO, step 4 and subsequent steps are repeated. If the answer is YES, in step 11, the rotational speed is examined to evaluate whether it is at the limit, and if the answer is YES, the operation is continued (the required head will not be achieved). If the answer is NO, then in step 12, the rotational speed is increased (by a predetermined amount) and the step 4 and all the subsequent steps are repeated.

If in step 8, it is judged that the head value is higher than the desired value, in step 13, the quantity ε' is computed according to equation (33), and the angle of the inlet guide vane is increased by an amount equal to (ε'−ε). In step 14, the angle of the inlet guide vane is examined to evaluate whether it is at the upper limit, if the answer is NO, then step 4 and all subsequent steps are repeated. If the answer is YES, in step 15, the rotational speed is decreased (by a predetermined amount), and step 4 and all subsequent steps are repeated.

In the following, a method of obtaining equation (33) will be explained.

FIG. 26 shows a performance curve and the resistance curve. It is assumed that the performance curve with the inlet guide vane at zero angle is known.

Next, for a given operational point defined by a given flow rate Q and a head H, the values of a flow coefficient φ $(4 \cdot Q/(\pi \cdot D_2^2 \cdot U_2))$ and a pressure coefficient ψ $(g \cdot H/(U_2^2))$ are calculated.

By assuming that the resistance curve through the operational point (φ, ψ) and the origin is a curve of second order, the coefficient of the curve is obtained (when there is a constant resistance, it is assumed that the value is known, and an intercept with the y-axis is obtained). The coordinates a (φ', ψ') of an intersection point of the resistance curve with the known device performance curve at zero angle of the inlet guide vane are obtained by calculation or other means.

From the value of φ', a flow rate Q' is obtained from the following equation.

$$Q' = \phi' \cdot \pi \cdot D_2^2 \cdot U_2/4 \tag{35}$$

Letting $A_1$ be the inlet area to the impeller, the fluid flow inlet velocity $Cm_1$ (to the impeller) is given by the following equation:

$$Cm_1 = Q'/A_1 = \phi' \cdot \pi \cdot D_2^2 \cdot U_2/(4 \cdot A_1) \tag{36}$$

The head H' of the turbomachinery is obtained from the difference between a product $U_2 \cdot CU_2$ and a product $U_1 \cdot CU_1$ where $U_2$, $U_1$ are a tangential exiting velocity from the impeller and a tangential entering velocity into the impeller, respectively; and $CU_2$, $CU_1$ are tangential components of the absolute velocity at the exit and at the inlet to the impeller, respectively. The difference equation is expressed as follows.

$$H' = (U_2 \cdot CU_2 - U_1 \cdot CU_1)/g \tag{37}$$

Here, since $$\psi' = (g \cdot H'/U_2^2), \text{ therefore,} \tag{38}$$

$$\psi' = (U_2 \cdot CU_2 - U_1 \cdot CU_1)/U_2^2. \tag{39}$$

Since the inlet guide vane angle is zero, the tangential component $CU_1$ of the absolute velocity at the entry end is zero. Therefore, the tangential component $CU_2$ of the absolute velocity at the exit end is given by the following equation.

$$CU_2 = U_2 \cdot \psi' \tag{40}$$

The present investigation established that the tangential component $CU_2$ of the absolute velocity depends only on the flow rate and not on the inlet guide vane angle.

Using this knowledge, the pressure coefficient, ψ for a given operating point, is given by the following equation:

$$\psi = (U_2^2 \cdot \psi' - U_1 \cdot CU_1)/U_2^2 \tag{41}$$
$$= \psi' - (U_1 \cdot CU_1)/U_2^2$$

therefore, the tangential component $CU_1$ of the absolute velocity at the inlet to the impeller is given by:

$$CU_1 = (\psi' - \psi) \cdot U_2^2/U_1. \tag{42}$$

Letting D1rms be the root means square average diameter at the inlet to the impeller, the inlet guide vane angle to satisfy the condition at the operating point is given by:

$$\epsilon_1 = \arctan(CU_1/Cm_1) \tag{43}$$
$$= \arctan\{A_1 \cdot (\psi' - \psi) \cdot U_2/(D_2^2 \cdot \phi' \cdot U_1)\}$$
$$= \arctan\{A_1 \cdot (\psi' - \psi)/(D_2 \cdot D_1 rms \cdot \phi)\}$$

here, by defining a constant k as $$k = A_1/(D_2 \cdot D_1 rms) \tag{44}$$

then, $$\epsilon_1 = \arctan\{k \cdot (\psi' - \psi)/\phi'\} \quad (45)$$

It should be mentioned that the method of obtaining the parameter fluctuation value Fp which forms the basis of evaluation by the computation device 21 and its threshold value is the same as that explained with reference to FIGS. 15 and 16, therefore, it will not be repeated.

As explained above, according to the turbomachinery (compressor) of the present invention, the angle of the inlet guide vanes 6 to provide the target performance, requested by the input data through the data input device 23, is computed, the vane angle adjusted and the turbomachinery is operated. When the angle of the inlet guide vanes 6 is adjusted, the flow pattern within the impeller is altered, and therefore, the fluid flow from the impeller exit is also altered. At this point, from the measured non-dimensional flow rate, an optimum angle of the diffuser vane 4 is decided according to the relations shown in FIGS. 12 and 16. If the operating condition is such that even after the adjustment of the diffuser vane angle, the system does not reach a satisfactory head value H, the rotational speed can be altered while avoiding the generation of instability. Therefore, it is clear that under any operating condition it is possible to control the angle of the diffuser vanes, from the knowledge of the non-dimensional flow rate so that the system can be operated at its optimum performance level by adjusting the diffuser vanes to match the flow from the impeller.

Figure 27:
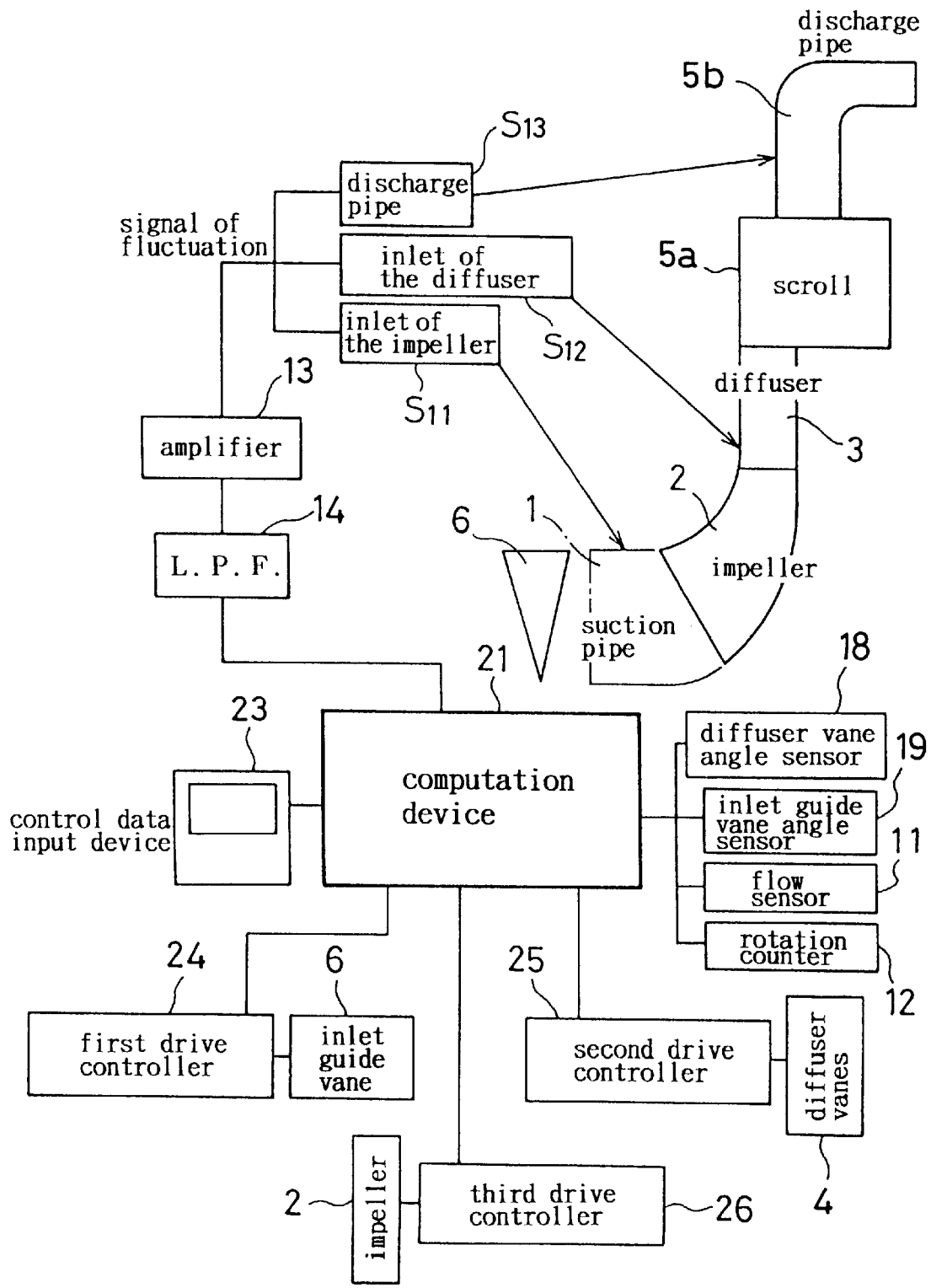
FIG. 27 is a block diagram for another embodiment of the turbomachinery with variable fluid guide vanes.

FIG. 27 is another example of block diagram of the control device group for the turbomachinery having inlet guide vane as shown in FIGS. 8, 9. The system is provided with a computation device 21, and it is provided with means to compute operational parameter fluctuations between the inlet and exit of the impeller, based on the data obtained during its operation, and to adjust the operational condition of the turbomachinery based on the fluctuation values.

To the input side of the computation device are connected sensors $S_{31}$~$S_{33}$, flow sensor 11, rotation counter 12, diffuser vane angle sensor 18, inlet guide vane angle sensor 19 and a data input device 23 for inputting operational parameters. To the output side are connected a first drive control device 24 for controlling the inlet guide vanes 6, a second drive control device 25 for controlling the angle of the diffuser vanes 4, and a third drive control device 26 for controlling the rotational speed of the impeller 2 are also provided. The functions provided by the separate units such as the amplifier 13 connected to the sensors $S_{31}$~$S_{33}$, filter 14, input interface and If computation device 21 may be replaced with a single microprocessor unit.

In the following, a method of operating the turbomachinery will be provided with reference to the flowchart given in FIG. 28.

In step 1, initial setting is performed by setting the rotational speed of the impeller 2 and the angle of the inlet guide vanes 6 appropriately. In step 2, inlet and exit pressures $P_1$, $P_2$ at the impeller 2 and inlet flow rate Q are measured by respective sensors, and after a certain time interval, another measurement is done to obtain another data $P_1'$, $P_2'$, Q'. In step 3, dPr/dQ is computed which is a ratio of difference of Pr to that of Q, from the output data $P_1$, $P_2$, Q, $P_1'$, $P_2'$, Q' obtained by the sensors 11, $S_{31}$, $S_{32}$. In step 4, the value of dPr/dQ is examined to see if it exceeds a limit (=0), and if it exceeds the limit, in step 5, the inlet guide vane is examined if it can be moved further in closing direction. If the inlet guide vane is at the limit, in step 6, the operation is stopped or warning is issued. When the inlet guide vane is adjustable, it is moved towards the closing direction by a predetermined pitch angle, and the process is returned to step 2 to repeat the subsequent steps.

In step 4, if the value of dPr/dQ does not exceed the limit, then, in step 8, head H is measured by pressure sensor $S_{13}$. Then, in step 9, it is checked to see that the head value is larger than the target value, and if it is YES, the operation is continued (step 10 ). If the head has not reached the target value, in step 11, the rotational speed is examined to see if it exceeds a predetermined limit, and if it is higher than the limit, further increase is not possible, and the operation is stopped or warning is issued in step 12. If the rotational speed is less than the limit, in step 13, it is increased by certain pitch rotation. The process is returned to step 2 to repeat the subsequent steps.

Figure 29:
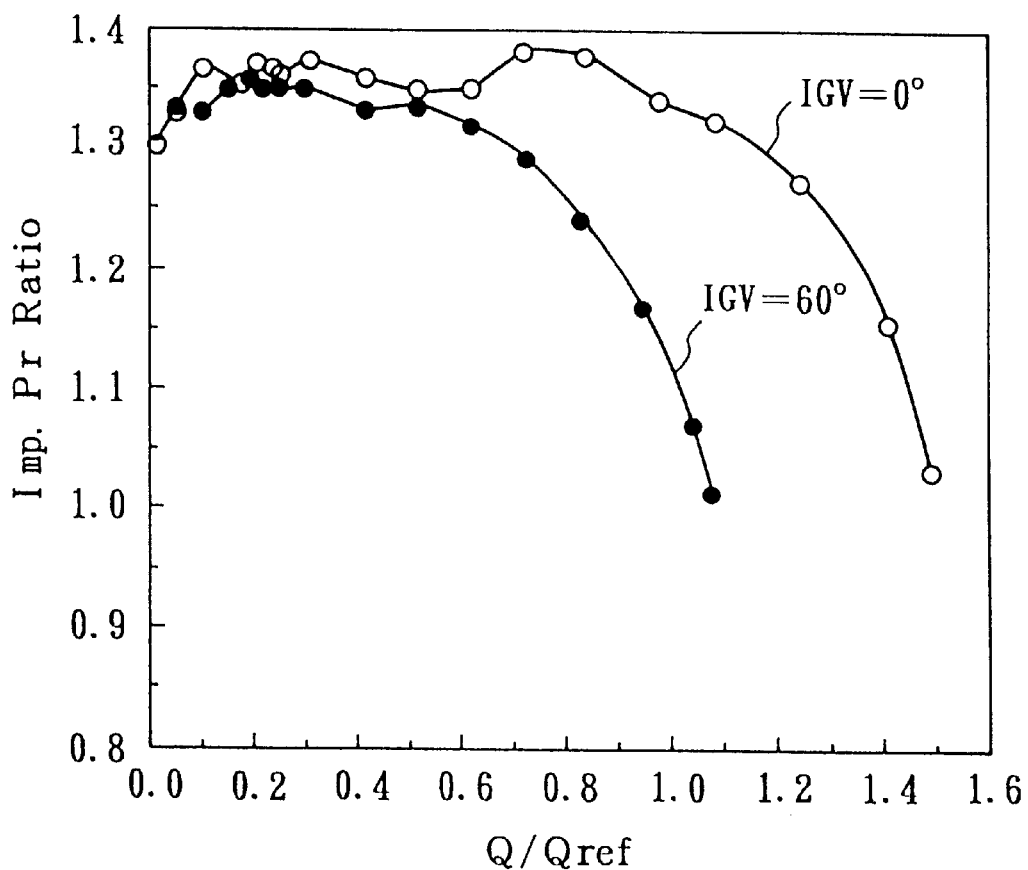
FIG. 29 is a graph showing the relationships between the flow rate and the pressure ratio in a turbomachinery.

It has been found that the pressure ratio Pr is a useful operational parameter. FIG. 29 shows the results of trials in which the inlet guide vane (IGV) at either 0 or 60 degrees, and the flow rates are changed to study the effects of flow rates on the pressure ratio. It was observed that minute vibrations begin at Q/Qref=0.6 when the IGV angle is zero, and at Q/Qref=0.4 when the IGV angle is 60 (Qref refers to the design flow rate). These results indicate that when changing the operation of the system from a steady state operation in the region of Q/Qref=1 to a lower value, it is important to monitor the transition point by setting a limit dPr/dQ=0, and taking some remedial actions when this limit is exceeded.

Figure 30:
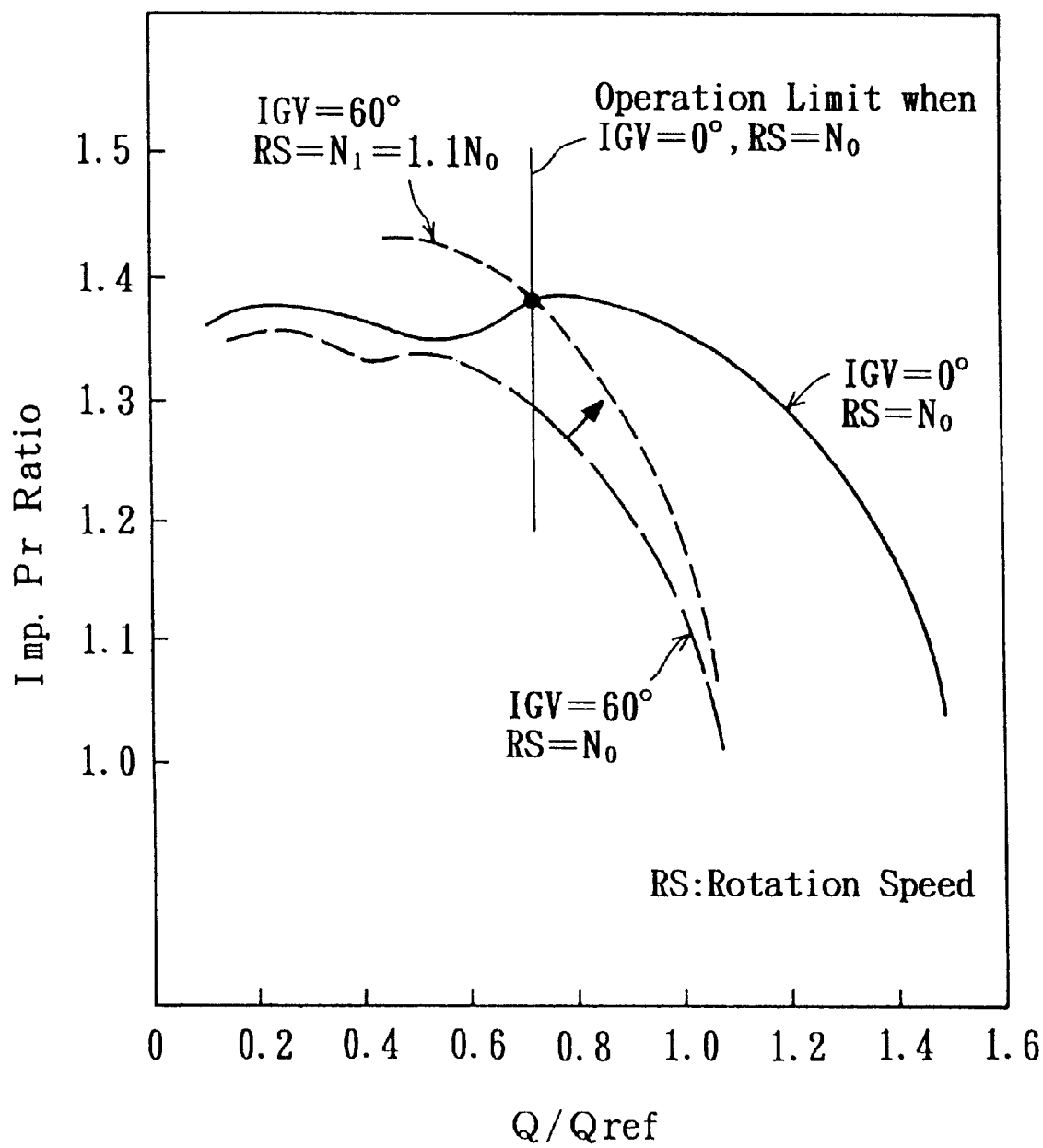
FIG. 30 is a graph showing the relationships between the flow rate and the pressure ratio in a turbomachinery.

FIG. 30 shows an example of a pattern change during the operation of the turbomachinery according to the present embodiment. Here, by setting the initial inlet guide vane angle at zero and the rotational speed of the impeller at $N_0$, gradual decrease in the flow rate to Q/Qref=0.75 produces dPr/dQ=0, thus making further operation impossible (step 4 ). Therefore, the IGV angle is increased to 60 degrees (step 7 ). Here, it is found that the given rotational speed cannot provide the target head value at the same flow rate Q/Qref= 0.75 (step 9 ). Therefore, the rotational speed was increased by 10% (step 13 ) to $N_1$, and it was found that the required head value is obtained at the flow rate of Q/Qref=0.75. It has thus been demonstrated that the pressure ratio Pr can provide a quick indication of the operating condition of the system to enable the operating parameter to be adjusted to produce a stable operation.

Figure 31:
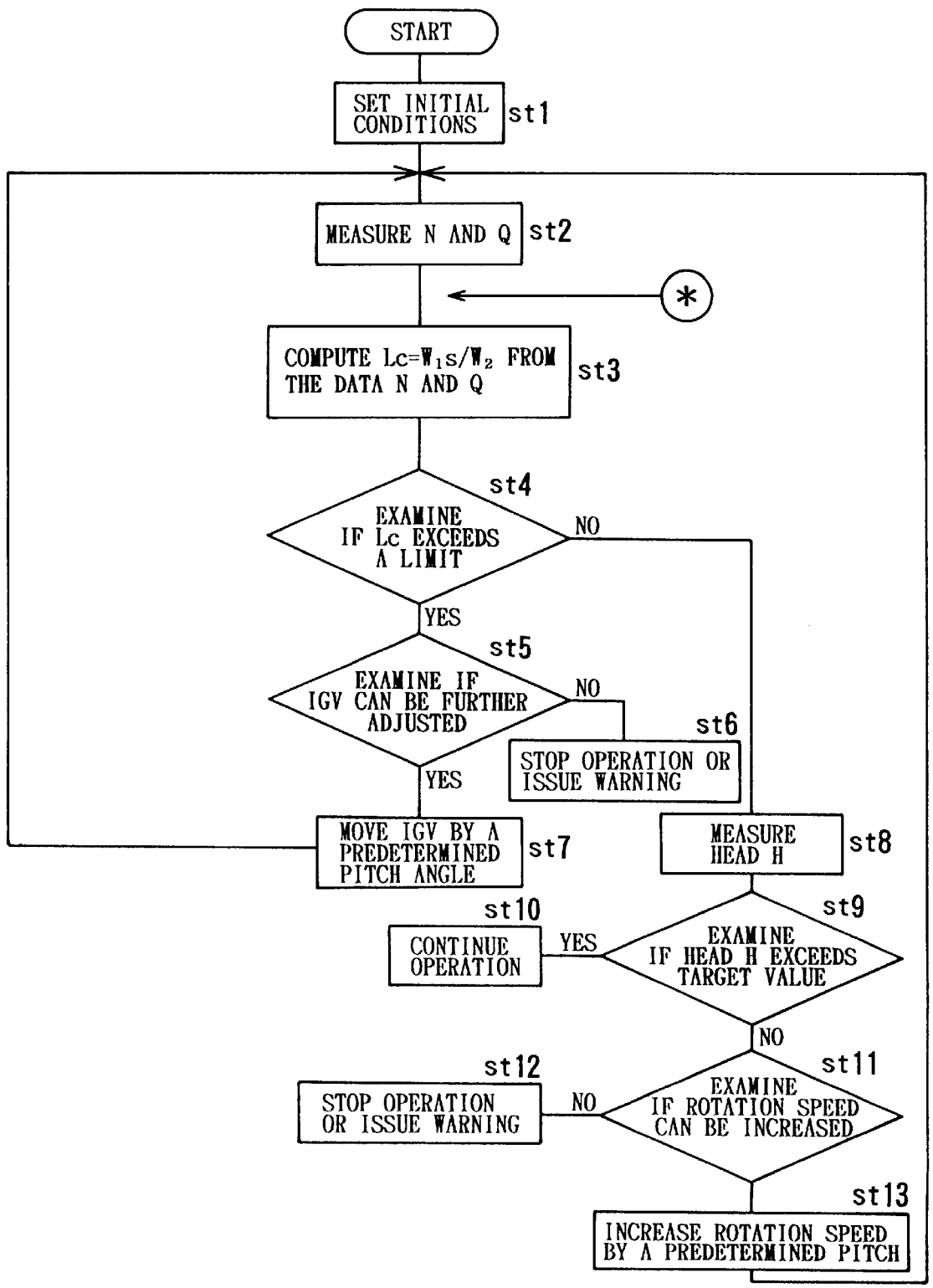
FIG. 31 is another flowchart showing the processing steps of another turbomachinery with the variable fluid guide vanes.

FIG. 31 shows a second embodiment of the method of operation, which utilizes a relative velocity ratio Lc at the inlet and exit of the impeller as an indicator of the operational status of the system.

In this method, after initial setting in step 1, then in step 2, rotational speed N of the impeller 2 and inlet flow rate Q are measured by respective sensors 11, 12. In step 3, a relative velocity ratio ($L_c = W_{1S}/W_2$) at the inlet and exit of the impeller is computed according to the measured values and equations described below. In step 4, the value of the ratio is examined to see if it exceeds a predetermined limit, and if it does, in step 5, it is examined whether the inlet guide vane 6 is adjustable in the closing direction. If it is not adjustable, in step 6, the operation is stopped or warning is issued. If the inlet guide vane is adjustable, in step 7, it is moved in the direction of closing by a certain pitch angle. Then the process returns to step 2 to repeat the subsequent steps. If the relative velocity ratio is less than the limit, then head H is measured in step 8. The following steps are the same with the case of FIG. 28, and the explanation is omitted.

The value of Lc in the above method is obtained as follows.

First, the peripheral speeds ($U_{1S}$, $U_{2S}$) at the impeller inlet and exit are obtained from the rotational speed of the impeller. Next, the radial velocity component $Cm_2$ at the impeller exit is obtained from the following equation using the data of the flow rate Q produced by the flow sensor 11.

$$Cm_2 = Q/\pi D_2 b_2 B \qquad (46)$$

where D is the outer diameter of the impeller, $b_2$ is the exit width of the impeller, B is the blockage factor. The tangential velocity component $Cu_2$ is obtained similarly.

$$Cu_2 = \sigma U_2 - Cm_2 \cot \beta_2 \qquad (47)$$

where $\sigma$ is a slip factor, $U_2$ is the peripheral speed of the impeller exit and $\beta_2$ is the blade exit angle at the impeller in the tangential direction.

From these values, the relative velocity ratio $W_2$ at the impeller exit is obtained from the following equation.

$$W_2 = \{Cm_2^2 + (U_2 - Cu_2)^2\}^{1/2} \qquad (48)$$

Next, the radial velocity component $Cm_1$ at the impeller inlet is obtained from the following equation using the data of the flow rate Q produced by the flow sensor 11.

$$Cm_1 = Q/\pi D_1 b_1 B \qquad (49)$$

The relative velocity at the shroud of the impeller inlet is obtained from the following equation.

$$W_{1S} = \{Cm_1^2 + (U_{1S} - Cu_1)^2\}^{1/2} \qquad (50)$$

where, $Cu_1$ is obtained from the angle of the inlet guide vane.

Next, the relative velocity ratio Lc at the impeller inlet is obtained from the following equation.

$$Lc = W_{1S}/W_2 \qquad (51)$$

Figure 32:
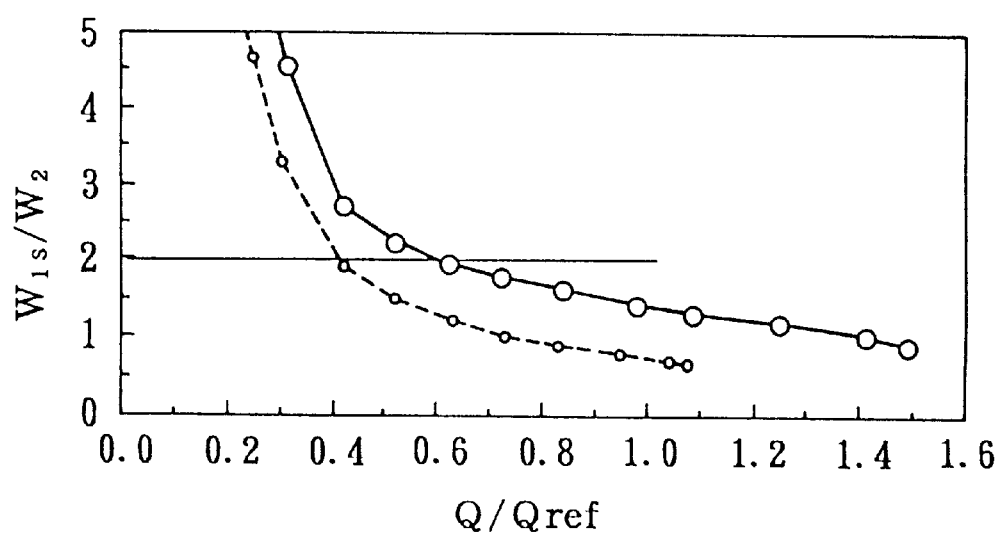
FIG. 32 is a graph showing other relationships between the flow rate and the relative velocity ratio in a turbomachinery.

It has been found that the relative velocity ratio Lc thus obtained is a useful indicator of the operating condition of the impeller of the turbomachinery. FIG. 32 shows the results of flow rates and the relative velocity ratios by setting the initial settings of the inlet guide vane angle at 0 and 60 degrees. It can be seen that when the steady flow rate Q/Qref is decreased to below 0.6, the system quickly becomes unstable. In other words, caution must be exercised when the relative velocity ratio $Lc = W_{1S}/W_2$ becomes larger than 2. It indicates that, in step 3, FIG. 31, the limit for the Lc may be taken as 2.0, for example.

Figure 28:
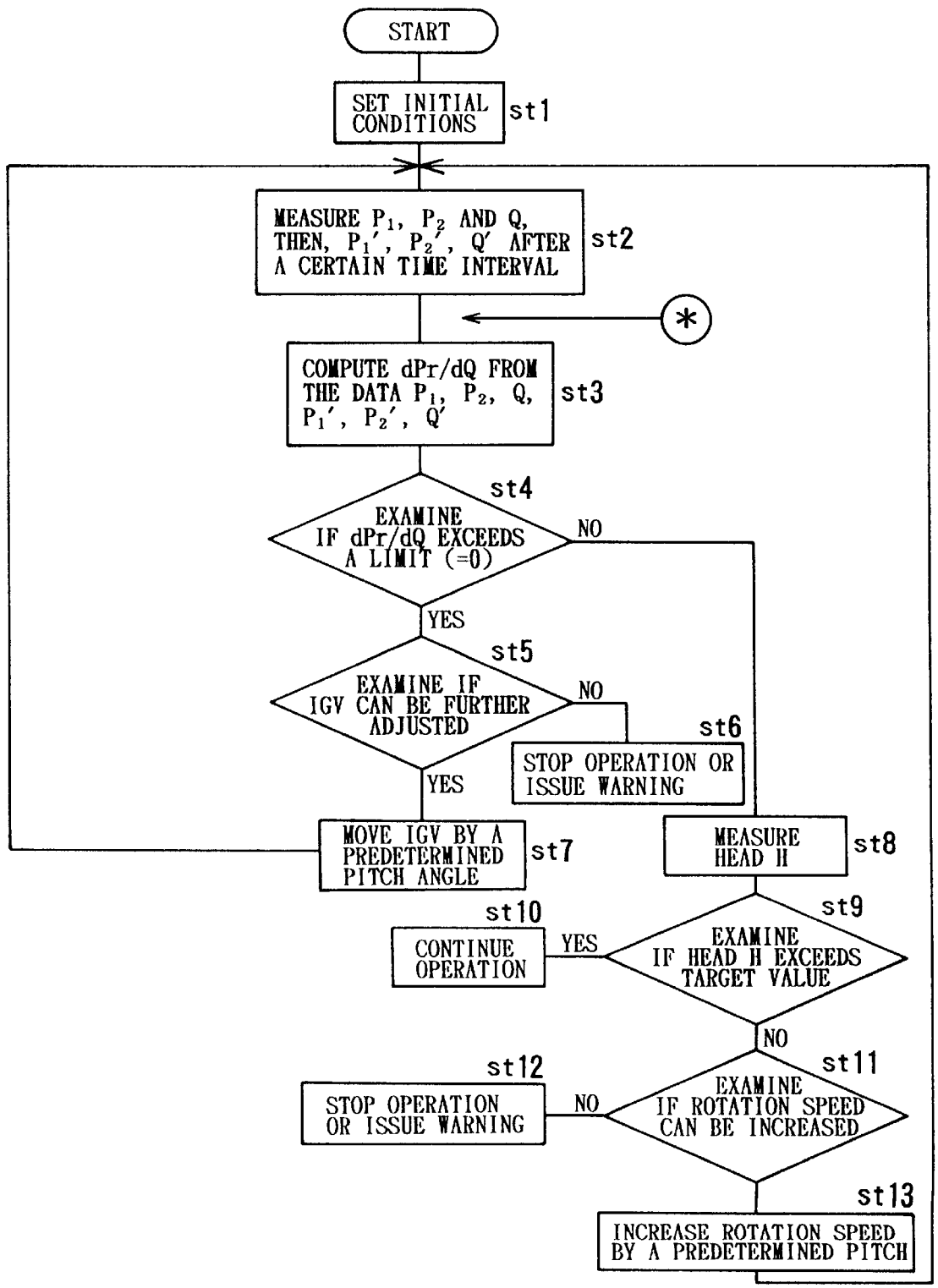
FIG. 28 is a flowchart showing the processing steps of the turbomachinery with the variable fluid guide vanes shown in FIG. 27.

In the embodiments described in FIGS. 28 and 31, it is also possible to adjust the diffuser vanes so as to generate an efficient flow in the diffuser. This method controls the diffuser vane according to a predetermined relationship between flow rate and diffuser vane angle which is shown in FIG. 14. That is, when the flow rate Q is larger than a certain value Qs (Qs/Qd≈0.7), diffuser vane angle is set as $\alpha+\beta$, and when the flow rate Q is smaller than Qs, it is set as $\alpha$. This process can be incorporated to the foregoing embodiments of FIGS. 28 and 31 at the locations indicated by *, for example.

Figure 33:
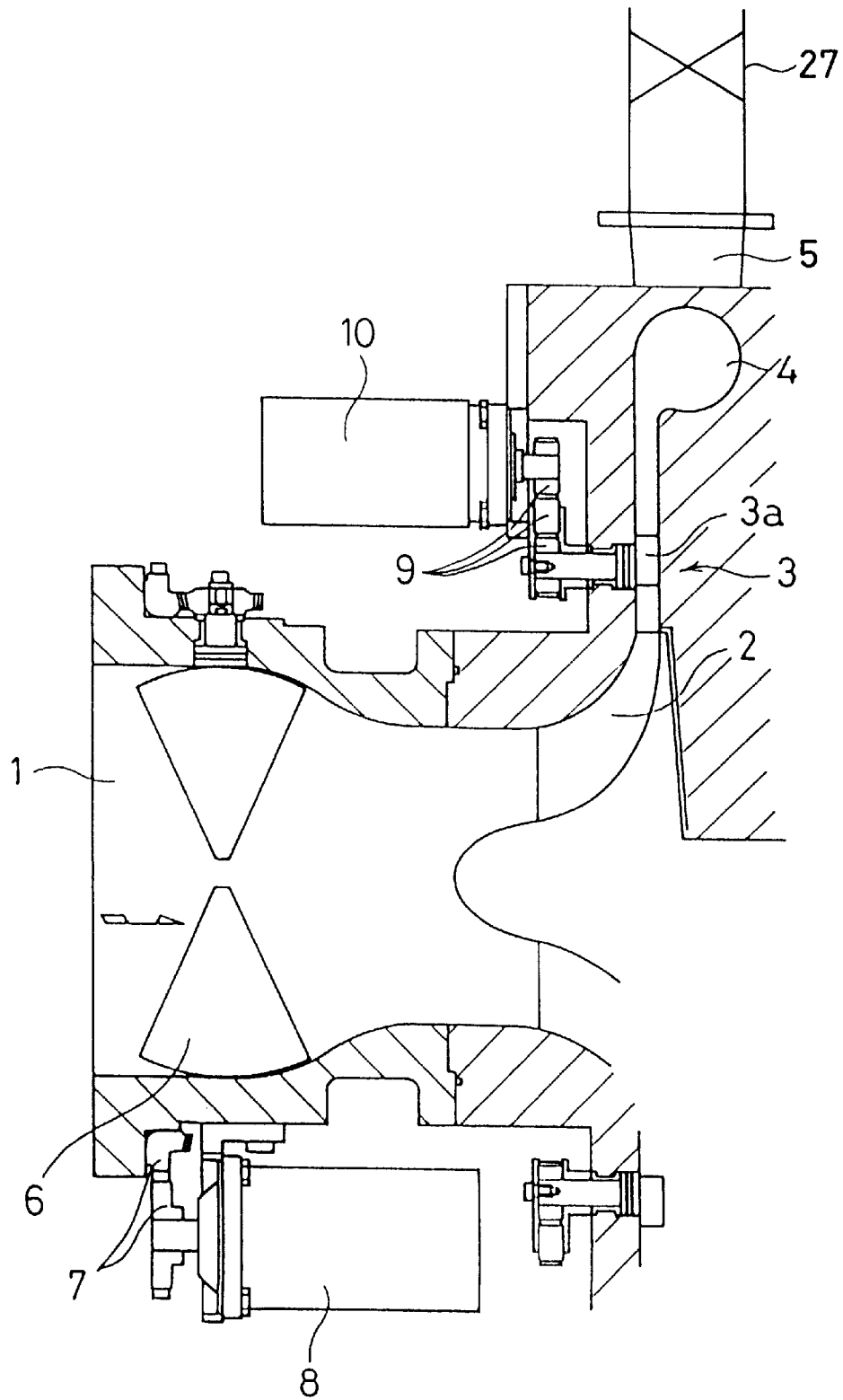
FIG. 33 is a cross sectional view of another embodiment of a turbomachinery having variable-angle vanes for a single-stage centrifugal compressor.
Figure 34:
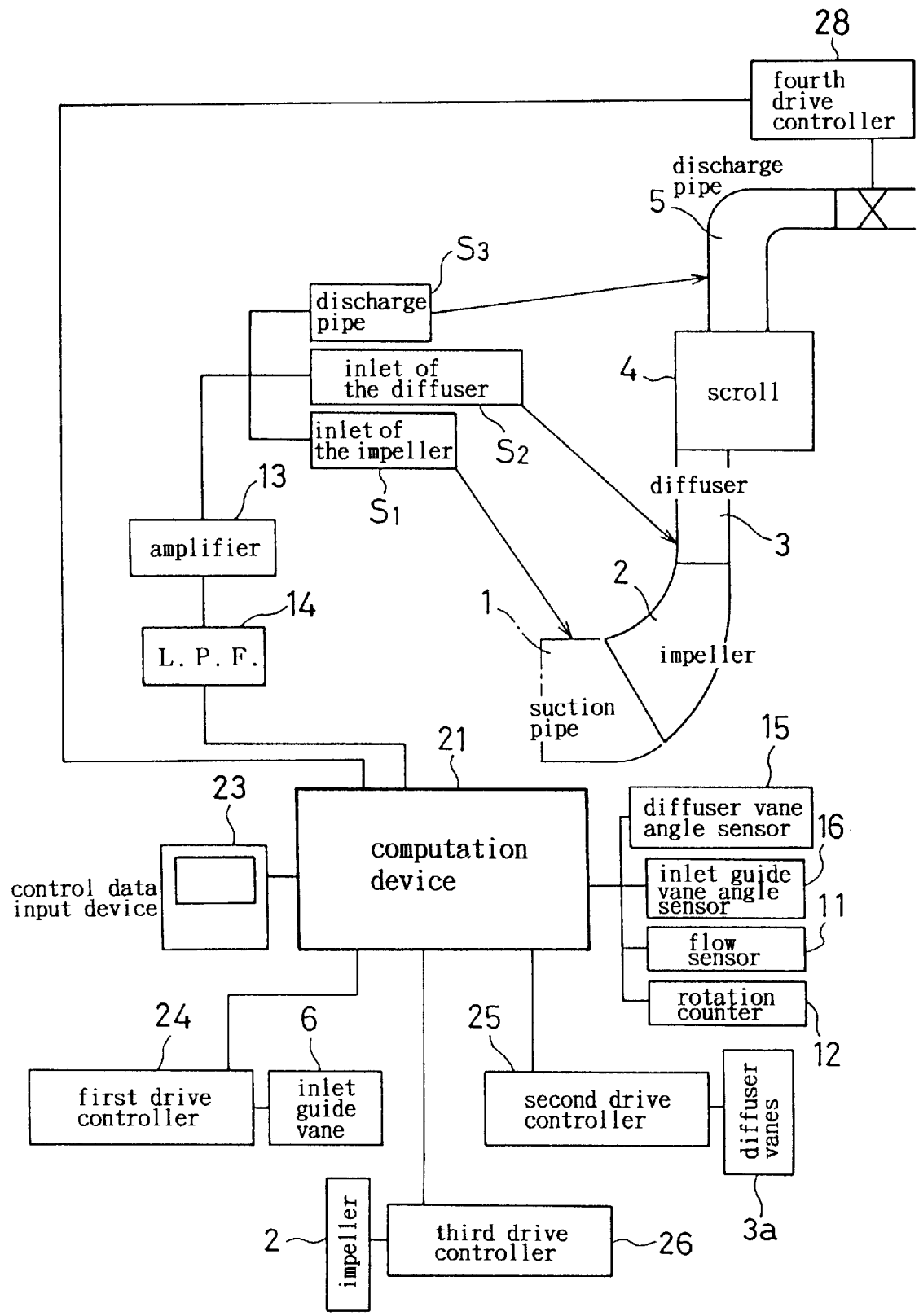
FIG. 34 is a block diagram of the embodiment of FIG. 33.
Figure 35:
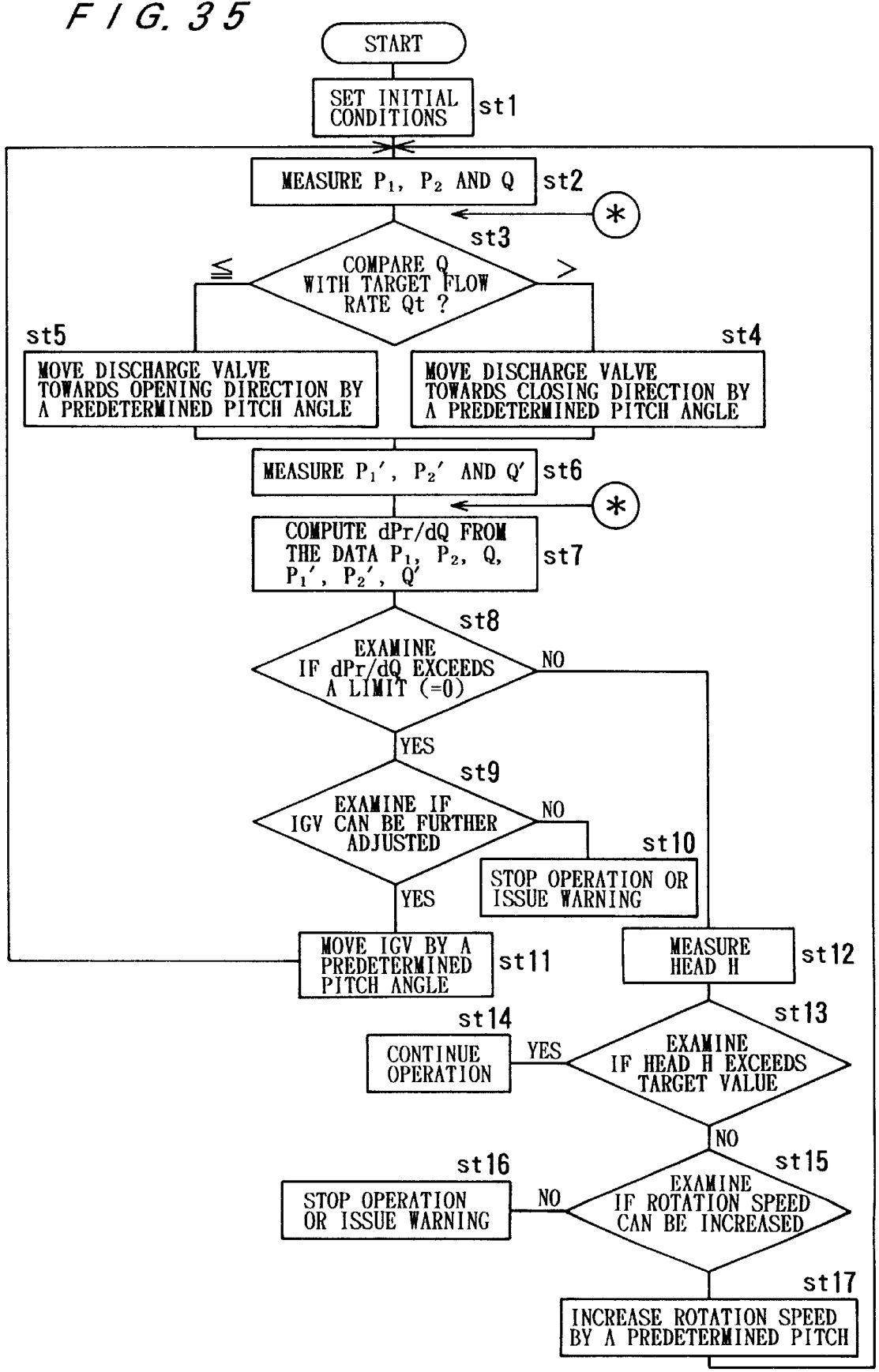
FIG. 35 is a flowchart showing the processing steps of the turbomachinery shown in FIG. 33.

FIG. 33 shows another embodiment of a single-stage centrifugal compressor which comprises a discharge valve 27 at discharge pipe 5 and fourth drive controller 28 connected to the computation device 21 for driving and controlling the discharge valve 27. FIG. 35 shows a flowchart for controlling the turbomachinery of the embodiment where ratio dPr/dQ is actively obtained by adjusting the opening of the discharge valve and changing the load condition of the turbomachinery. This is useful since, in the embodiment of FIG. 28, it is impossible under a certain load condition to compute the ratio because the difference is too small.

In the flowchart, at the initial setting of step 1, a target flow rate Qt is also input via inputting device 23. In step 2, first measurement of inlet and exit pressures $P_1$, $P_2$ at the impeller 2 and inlet flow rate Q is conducted. In step 3, Q is compared with Qt. If Q>Qt, then in step 4, the discharge valve 27 is closed by certain pitch angle, if Q≦Qt, then in step 5, the discharge valve 27 is opened by certain pitch angle. Then the second measurement is conducted and, in step 6, ratio dPr/dQ is computed from the data $P_1$, $P_2$, Q, $P_1'$, $P_2'$, Q' obtained through two measurements. The following process is the same with the case of FIG. 28 and explanation is omitted.

In this embodiment, it is possible to estimate the degree of stability of the flow in the impeller 2, by intentionally changing the load, which can predict the unstable condition at earlier stages in advance. In this embodiment, it is also possible to adjust the diffuser vanes as explained above. In the above embodiments, a plurality of drive controllers are provided for each function, which can be constructed in one device.

What is claimed is:

1. A turbomachinery with variable-angle flow guiding device comprising:

an impeller;

diffuser vanes;

parameter monitoring means for monitoring inlet flow volume rates or an operational parameter of the turbomachinery or a drive source thereof, said operational parameter being correlative to the inlet flow volume rates; and a control means for controlling a setting angle of diffuser vanes in accordance with a sum of a first angle and a second angle, wherein said first angle is a fluid flow angle obtained from a predetermined relation between flow angles at an exit of said impeller and inlet flow volume rates, and said second angle is an angle equivalent to an angle of attack.

2. A turbomachinery as claimed in claim 1, wherein said predetermined relation between flow angles at an exit of said impeller and inlet flow volume rates is an approximately linear relation.

3. A turbomachinery as claimed in claim 2, wherein a slope of said predetermined relation is dependent on a rotational speed of said impeller.

4. A turbomachinery as claimed in claim 1, wherein said control device adjusts a rotational speed of said turbomachinery when changes in diffuser vane angles do not generate a desired value of head coefficient.

5. A turbomachinery as claimed in claim 1, wherein said control device adjusts an angle of said inlet guide vanes when changes in diffuser vane angles do not generate a desired value of head coefficient.

6. A turbomachinery as claimed in claim 1, wherein data of said sum of said first angle and said second angle corresponding to said inlet flow volume rates or other operational parameter measured by said monitoring means are memorized in said control means.

7. A turbomachinery as claimed in claim 1, wherein said attack angle is selected so as to generate a maximum lift coefficient for said diffuser vane.

8. A turbomachinery as claimed in claim 1, wherein said control means controls said setting angle of diffuser vanes in accordance with a sum of said first angle and said second angle at flow rates higher than a predetermined reference flow rate.

9. A turbomachinery as claimed in claim 8, wherein said control means controls said setting angle of diffuser vanes so as to maintain pressure fluctuation below a predetermined threshold value at flow rates lower than said reference flow rate.

10. A turbomachinery as claimed in claim 8, wherein said control means controls said setting angle of diffuser vanes so as to produce a minimal pressure fluctuation at flow rates lower than said reference flow rate.

11. A turbomachinery with a variable-angle flow guiding device comprising:

an impeller;

diffuser vanes;

parameter monitoring means for monitoring inlet flow volume rates or an operational parameter of the turbomachinery or a drive source thereof, said operational parameter being correlative to the inlet flow volume rates; and a control means for controlling a setting angle of diffuser vanes in accordance with a sum of a first angle and a second angle, wherein said first angle is a fluid flow angle obtained from a relation between flow angles at an exit of said impeller and inlet flow volume rates, and said second angle is an angle equivalent to an angle of attack, wherein said relation is given by an equation:

$$\alpha = \text{arc tan } \{Q/(K_1 N - K_2 Q)\}$$

wherein $\alpha$ is the flow angle, Q is the inlet flow volume rate, $K_1$ is a constant given by $(\pi D_2)^2 \sigma b_2 B$, $K_2$ is a constant given by $\cot\beta_2$, $\sigma$ is a slip factor, B is a blockage factor, N is the rotational speed, $\beta_2$ is the blade exit angle of the impeller in the tangential direction, and $D_2$ is the impeller outer diameter.

12. A turbomachinery with a variable-angle flow guiding device comprising:

an impeller;

diffuser vanes;

parameter monitoring means for monitoring inlet flow volume rates or an operational parameter of the turbomachinery or a drive source thereof, said operational parameter being correlative to the inlet flow volume rates;

a rotation speed sensor for detecting rotation speed of said turbomachinery; and a control means for controlling a setting angle of diffuser vanes in accordance with a sum of a first angle and a second angle wherein said first angle is a fluid flow angle obtained from a predetermined relation between flow angles at an exit of said impeller and inlet flow volume rates, and said second angle is an angle equivalent to an angle of attack, wherein said predetermined relation is given by an equation:

$$\alpha = \text{arc tan } \{Q/(K_1 N - K_2 Q)\}$$

wherein $\alpha$ is the flow angle, Q is the inlet flow volume rate, $K_1$ is a constant given by $(\pi D_2)^2 \sigma b_2 B$, $K_2$ is a constant given by $\cot\beta_2$, $\sigma$ is a slip factor, B is a blockage factor, N is the rotational speed, $\beta_2$ is the blade exit angle of the impeller in the tangential direction, and $D_2$ is the impeller outer diameter.

13. A turbomachinery with a variable-angle flow guiding device comprising:

an impeller;

diffuser vanes;

parameter monitoring means for monitoring inlet flow volume rates or an operational parameter of the turbomachinery or a drive source thereof, said operational parameter being correlative to the inlet flow volume rates;

pressure monitoring means for monitoring inlet and exit pressures; and a control means for controlling a setting angle of diffuser vanes in accordance with a sum of a first angle and a second angle wherein said first angle is a fluid flow angle obtained from a predetermined relation between flow angles at an exit of said impeller and inlet flow volume rates, and said second angle is an angle equivalent to an angle of attack, wherein said first angle is computed from an equation:

$$\alpha = \text{arc tan } [(1/P_r)^{1/\kappa} \cdot Q / \{K_1 N - (1/P_r)^{1/\kappa} \cdot K_2 Q\}]$$

wherein $\alpha$ is a flow angle, Q is an inlet flow volume rate, $P_r$ is a ratio of pressures at inlet and exit, $K_1$ is a constant given by $(\pi D_2)^2 \sigma b_2 B$, $K_2$ is a constant given by $\cot\beta_2$, $\sigma$ is a slip factor, $\kappa$ is a ratio of specific heats, B is a blockage factor, N is a rotational speed, $\beta_2$ is a tangential flow angle from the impeller, and $D_2$ is an impeller outer diameter.

14. A turbomachinery with a variable-angle flow guiding device comprising:

an impeller;

diffuser vanes;

parameter monitoring means for monitoring inlet flow volume rates or an operational parameter of the turbomachinery or a drive source thereof, said operational parameter being correlative to the inlet flow volume rates;

a rotation speed sensor for detecting rotation speed of said turbomachinery;

pressure monitoring means for monitoring inlet and exit pressures; and a control means for controlling a setting angle of diffuser vanes in accordance with a sum of a first angle and a second angle wherein said first angle is a fluid flow angle obtained from a predetermined relation between flow angles at an exit of said impeller and inlet flow volume rates, and said second angle is an angle equivalent to an angle of attack, wherein said first angle is computed from an equation:

$$\alpha = \text{arc tan } [(1/P_r)^{1/\kappa} \cdot Q / \{K_1 N - (1/P_r)^{1/\kappa} \cdot K_2 Q\}]$$

wherein $\alpha$ is a flow angle, Q is an inlet flow volume rate, $P_r$ is a ratio of pressures at inlet and exit, $K_1$ is a constant given by $(\pi D_2)^2 \sigma b_2 B$, $K_2$ is a constant given by $\cot\beta_2$, $\sigma$ is a slip factor, $\kappa$ is a ratio of specific heats, B is a blockage factor, N is a rotational speed, $\beta_2$ is a tangential flow angle from the impeller, and $D_2$ is an impeller outer diameter.

15. A method of controlling an operation of a turbomachinery having inlet guide vanes and impellers comprising the steps of:

obtaining current operating data through sensors arranged within said turbomachinery;

computing a parameter representing a degree of stability of the flow within said impeller based on said current operating data; and adjusting the angle of said inlet guide vane and rotational speed of said impeller so that said parameter is maintained within a predetermined range and the flow rate value and the head value measured by said sensors satisfy respective required values, wherein said operating parameter is a ratio of fluid velocity at the inlet and exit of said impeller.

16. A method of controlling an operation of a turbomachinery having inlet guide vanes and impellers comprising the steps of:

obtaining current operating data through sensors arranged within said turbomachinery;

computing a parameter representing a degree of stability of the flow within said impeller based on said current operating data; and adjusting the angle of said inlet guide vane and rotational speed of said impeller so that said parameter is maintained within a predetermined range and the flow rate value and the head value measured by said sensors satisfy respective required values, wherein said operating parameter is a rate of change of a ratio of fluid pressure at the inlet and exit of said impeller with respect to a flow rate.

17. A controlling method as claimed in claim 16, wherein said turbomachinery comprises a discharge valve provided at a discharge pipe of said turbomachinery for adjusting quantity of a discharged fluid, wherein said rate of change is obtained by changing the opening of said discharge valve.

* * * * *